(12) United States Patent
Gallagher et al.

(10) Patent No.: US 8,523,224 B2
(45) Date of Patent: Sep. 3, 2013

(54) RESTRAINT SYSTEM FOR WALKIE/RIDER PALLET TRUCK

(75) Inventors: Michael P. Gallagher, Greenville, OH (US); Markus Graf, Karlsfeld (DE); Franz Pöschl, Erding (DE); Sultan Masoud Karimi, Munich (DE); James V. Kraimer, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 903 days.

(21) Appl. No.: 12/577,245

(22) Filed: Oct. 12, 2009

(65) Prior Publication Data

US 2010/0089703 A1 Apr. 15, 2010

Related U.S. Application Data

(60) Provisional application No. 61/105,146, filed on Oct. 14, 2008.

(51) Int. Cl.
*B60R 21/02* (2006.01)

(52) U.S. Cl.
USPC .......................................... 280/748; 280/756

(58) Field of Classification Search
USPC .................................. 280/748, 756
See application file for complete search history.

(56) References Cited

U.S. PATENT DOCUMENTS

| | | | |
|---|---|---|---|
| 3,584,897 A * | 6/1971 | Frantz et al. | 280/756 |
| 3,899,042 A | 8/1975 | Bonar | |
| 4,388,980 A | 6/1983 | Vig et al. | |
| 4,480,713 A | 11/1984 | Macht et al. | |
| 4,840,248 A | 6/1989 | Silverman | |
| 5,129,478 A * | 7/1992 | Suenaga et al. | 180/268 |
| 5,135,080 A | 8/1992 | Haston | |
| 6,135,497 A | 10/2000 | Sutherland et al. | |
| 6,299,207 B1 | 10/2001 | Bares | |
| 6,464,025 B1 * | 10/2002 | Koeper et al. | 180/19.2 |
| 6,530,448 B2 | 3/2003 | Abels et al. | |
| 6,732,829 B2 | 5/2004 | Bares | |
| 6,752,422 B2 * | 6/2004 | Sauermann | 280/748 |
| 6,902,024 B2 | 6/2005 | Miiller et al. | |
| 7,017,689 B2 * | 3/2006 | Gilliland et al. | 180/19.1 |
| 7,097,237 B2 | 8/2006 | Weiner et al. | |
| 7,125,069 B2 | 10/2006 | Cacucci et al. | |
| 7,156,443 B1 | 1/2007 | Jung | |

(Continued)

FOREIGN PATENT DOCUMENTS

| | | |
|---|---|---|
| EP | 0466065 A1 | 1/1992 |
| FR | 2333748 A1 | 7/1977 |

(Continued)

OTHER PUBLICATIONS

Eastpower warehouse equipments, Electric pallet truck EPT-20-20A, publication year 2008.*

(Continued)

*Primary Examiner* — Toan To
(74) *Attorney, Agent, or Firm* — Stevens & Showalter LLP

(57) ABSTRACT

A walkie/rider pallet truck is provided comprising a power unit; a set of forks associated with the power unit; a platform associated with the power unit and defining a location upon which an operator may stand; and a restraint system comprising a pivotable restraint structure. The restraint structure is movable to one of a walkie position, a rider-driving position and a quick-exit position.

20 Claims, 19 Drawing Sheets

(56) References Cited

U.S. PATENT DOCUMENTS

| | | | |
|---|---|---|---|
| 7,900,734 B2* | 3/2011 | Knie et al. | 180/252 |
| 8,104,583 B2* | 1/2012 | Rekow et al. | 187/222 |
| 2001/0033073 A1 | 10/2001 | Hammond et al. | |
| 2003/0029648 A1* | 2/2003 | Trego et al. | 180/19.1 |
| 2004/0212217 A1 | 10/2004 | Cacucci et al. | |
| 2005/0036880 A1 | 2/2005 | Magoto et al. | |
| 2006/0163912 A1 | 7/2006 | Gale et al. | |
| 2007/0228712 A1 | 10/2007 | Hansen et al. | |

FOREIGN PATENT DOCUMENTS

| | | |
|---|---|---|
| FR | 2822124 A1 | 9/2002 |
| FR | 2832992 A1 | 6/2003 |
| GB | 1346032 | 2/1974 |

OTHER PUBLICATIONS

Photograph 3; BT truck; International Materials Handling Exhibition (IMHX) Show; Mar. 16, 2007; Birmingham, UK.
Photograph 4; BT truck; 2 pages.
Photograph 5; Unknown supplier truck; International Materials Handling Exhibition (IMHX) Show; Mar. 16, 2007; Birmingham, UK.
Photograph 6; Unknown supplier truck; International Materials Handling Exhibition (IMHX) Show; Mar. 16, 2007; Birmingham, UK.
Photograph 7; Yale truck; International Materials Handling Exhibition (IMHX) Show; Mar. 16, 2007; Birmingham, UK.
Photograph 8; Yale truck; International Materials Handling Exhibition (IMHX) Show; Mar. 16, 2007; Birmingham, UK.
Photograph 9; iCem truck; International Materials Handling Exhibition (IMHX) Show; Mar. 16, 2007; Birmingham, UK.
Photograph 10; Jungheinrich truck.
Photograph 11; Jungheinrich truck; CeMAT show; Jun. 1, 2008; Hannover, Germany.
Photograph 12; Linde truck; 2 pages.
Photograph 13; LOC truck; International Materials Handling Exhibition (IMHX) Show; Mar. 16, 2007; Birmingham, UK.
Wochinz, Reinmar; International Search Report and Written Opinion of the International Searching Authority; Mar. 17, 2010; European Patent Office.
Crown; WP 2300 Series; Powered Pallet Truck; WP 2300 Spec GB; May 2008; Crown Gabelstapler GmbH & Co. KG; Roding, Germany.
Photograph 1; Stocklin truck; International Material Handling Exhibition (IMHX) Show; Mar. 16, 2007; Birmingham, UK.
Photograph 2; Abeko truck; International Materials Handling Exhibition (IMHX) Show; Mar. 16, 2007; Birmingham, UK.
Photograph 14; Mitsubishi truck; International Materials Handling Exhibition (IMHX) Show; Mar. 16, 2007; Birmingham, UK.
Photograph 15; OM truck; International Materials Handling Exhibition (IMHX) Show; Mar. 16, 2007; Birmingham, UK.
Photograph 16; OM truck; International Materials Handling Exhibition (IMHX) Show; Mar. 16, 2007; Birmingham, UK.
Photograph 17; Pramac truck; International Materials Handling Exhibition (IMHX) Show; Mar. 16, 2007; Birmingham, UK.

* cited by examiner

RESTRAINT SYSTEM FOR WALKIE/RIDER PALLET TRUCK

RELATED APPLICATION

This application claims the benefit of: U.S. Provisional Application No. 61/105,146, filed Oct. 14, 2008 and entitled "RESTRAINT SYSTEM FOR WALKIE/RIDER PALLET TRUCK," the entire disclosure of which is incorporated by reference herein.

FIELD OF THE INVENTION

The present invention relates to a restraint system for a walkie/rider pallet truck and, more particularly, to such a restraint system comprising a pivotable restraint structure capable of being moved to one of a walkie position, a rider-driving position and a quick-exit position.

BACKGROUND OF THE INVENTION

A typical walkie/rider pallet truck includes load carrying forks and a power unit having a steerable wheel, a steering control unit, a brake, an electric traction motor, a storage battery, a platform onto which the operator may step and ride while controlling the truck and a pivotable restraint structure. The steering unit normally has a handle mounted at the end of a movable steering arm with the handle including controls for raising and lowering the forks and one or more rotatable devices to control the speed and direction (forward and reverse) of the truck.

In stock picking operations, a truck operator typically follows a winding, unidirectional route through a warehouse, picking up stock in a predetermined sequence in order to maximize productivity. The operator normally walks alongside the truck when the distance along the route between picks is short and steps onto the truck platform to ride when the distance between picks is longer. When the operator is riding on the truck platform, it is desirable for optimum work productivity to move the truck at higher speeds than when the operator is walking beside it.

In dock applications, a truck operator typically drives in and out of trailers, or drives in certain storage lanes in a shipping or receiving area of a warehouse. The operator often gets on and off the truck to scan barcode labels on a pallet, which is located on the forks. Or, in some cases, the operator may need to adjust the pallet for better stacking or storing in the trailer.

Prior art pivotable U-shaped restraint structures are typically positionable in either a stowed position or a rider-driving position. The restraint structures include side elements that extend along opposing sides of an operator when the operator is standing on the platform and the restraint structure is in the rider-driving position. The side elements are integral with an intermediate element that extends between the side elements so as to define the U-shaped restraint structure. When in a stowed position, the restraint structure may be positioned in either a substantially downward, vertical or near vertical position adjacent to the truck power unit or positioned in a horizontal or near horizontal position over the truck power unit. Hence, to move the restraint structure from its stowed position to its rider-driving position, an operator must bend over and lift the restraint structure from its downward stowed position or reach out over the power unit main housing and lift up the restraint structure from its stowed position out over the power unit main housing. The lifting operation is disadvantageous.

Other prior art restraint structures comprise a pair of inwardly foldable restraint members, wherein each restraint member is separately coupled to the truck power unit. Typically, the restraint members are positionable in a first stowed position against the power unit and a second, outwardly extending position so as to extend along opposing sides of an operator when the operator is standing on the platform. When exiting a side of the platform, an operator typically steps backwards off the end of the platform without folding-up the restraint members, then steps sideward around the restraint, and then walks forward to the fork area. This operation requires extra walking steps which is time consuming and, hence, inefficient. Alternatively, the operator could also step off the side of the platform. In this case, the operator must move his body toward the opposite side of the platform in which he wants to exit, then pivot the opposing restraint member inward against the power unit, and then step off the open side of the truck. This operation requires fewer walking steps, but also requires extra movement of the body, which is time consuming and, hence, inefficient.

SUMMARY OF THE INVENTION

In accordance with a first aspect of the present invention, a walkie/rider pallet truck is provided comprising: a power unit; a set of forks associated with the power unit; a platform associated with the power unit and defining a location upon which an operator may stand; and a restraint system comprising a pivotable restraint structure. The restraint structure is movable to one of a walkie position, a rider-driving position and a quick-exit position.

In accordance with one embodiment of the present invention, the restraint structure may be positioned within an angular range of from about 0 degrees to about 25 degrees from vertical and extend upward and away from the platform when in the quick-exit position. In accordance with another embodiment of the present invention, the restraint structure may be positioned within an angular range of from about 0 degrees to about 25 degrees from vertical and extend upward and toward the platform when in the quick-exit position.

The restraint structure may be in a stowed position when located in the walkie position and an outwardly, extended position when in the rider-driving position.

The restraint structure may comprise a generally U-shaped structure, which is adapted to extend along opposing sides of an operator when the operator is standing on the platform and the restraint structure is in the rider-driving position.

The restraint system may further comprise a mechanism for releasably locking the restraint structure in the rider-driving position. The locking mechanism may comprise a pivotable lever having an engagement member capable of releasably engaging a stop member forming part of the restraint structure.

In accordance with a second aspect of the present invention, a walkie/rider pallet truck is provided comprising: a power unit comprising a drive/braking system; a set of forks associated with the power unit; a platform associated with the power unit and defining a location upon which an operator may stand; a controller to control the operation of the drive/braking system; a restraint system comprising a pivotable restraint structure; and a sensor apparatus. The restraint structure may be movable to a quick-exit position. The sensor apparatus may sense when the restraint structure is in the quick-exit position and generate a corresponding quick-exit position signal to the controller. The controller may generate a brake command signal to the drive/braking system in response to receiving the quick-exit position signal from the sensor apparatus.

The restraint structure is also capable of being moved to a walkie position or a rider-driving position.

The sensor apparatus may further sense when the restraint structure is in the walkie position or the rider-driving position. The sensor apparatus may generate a walkie position signal to the controller when the restraint structure is in the walkie position and generate a rider-driving position signal to the controller when the restraint structure is in the rider-driving position. The controller may control the drive/braking system to a speed falling within a range from zero to a first maximum speed in response to receiving the walkie position signal and control the drive/braking system to a speed falling within a range from zero to a second maximum speed in response to receiving the rider-driving position signal. Preferably, the second maximum speed is greater than the first maximum speed.

The sensor apparatus may further be capable of sensing when the restraint structure is positioned between the walkie position and the rider-driving position. The sensor apparatus may generate an intermediate position signal to the controller when the restraint structure is located between the walkie position and the rider-driving position. The controller may generate a braking command signal to the drive/braking system so as to allow the truck to slow down and stop if the truck is in motion and in response to receiving the intermediate position signal, and generate a no-drive command signal to the drive/braking system if the truck is stopped and in response to receiving the intermediate position signal.

In accordance with a third aspect of the present invention, a walkie/rider pallet truck is provided comprising: a power unit comprising a drive/braking system; a set of forks associated with the power unit; a platform associated with the power unit and defining a location upon which an operator may stand; a controller for controlling the operation of the drive/braking system; a restraint system comprising a pivotable restraint structure; and a sensor apparatus. The restraint structure may be movable to one of a walkie position, a rider-driving position and a quick-exit position. The sensor apparatus may sense when the restraint structure is in the quick-exit position and generate a quick-exit position signal to the controller.

The restraint structure may be positioned within an angular range of from about 0 degrees to about 25 degrees from vertical and extend upward when in the quick-exit position.

The controller may generate a brake command signal to the drive/braking system in response to receiving the quick-exit position signal from the sensor apparatus.

The sensor apparatus may further sense when the restraint structure is in the walkie position or the rider-driving position. The sensor apparatus may generate a walkie position signal to the controller when the restraint structure is in the walkie position and a rider-driving position signal to the controller when the restraint structure is in the rider-driving position. The controller may control the drive/braking system to a speed falling within a range from zero to a first maximum speed in response to receiving the walkie position signal and control the drive/braking system to speed falling within a range from zero to a second maximum speed in response to receiving the rider-driving position signal. Preferably, the second maximum speed is greater than the first maximum speed.

The sensor apparatus may further be capable of sensing when the restraint structure is positioned between the walkie position and the rider-driving position. The sensor apparatus may generate an intermediate position signal to the controller when the restraint structure is located between the walkie position and the rider-driving position. The controller may generate a brake command signal to the drive/braking system so as to allow the truck to slow down and stop if the truck is in motion and in response to receiving the intermediate position signal. The controller may alternatively generate a no-drive signal to the drive/braking system if the truck is stopped and in response to receiving the intermediate position signal.

DETAILED DESCRIPTION OF THE INVENTION

Figure 1:
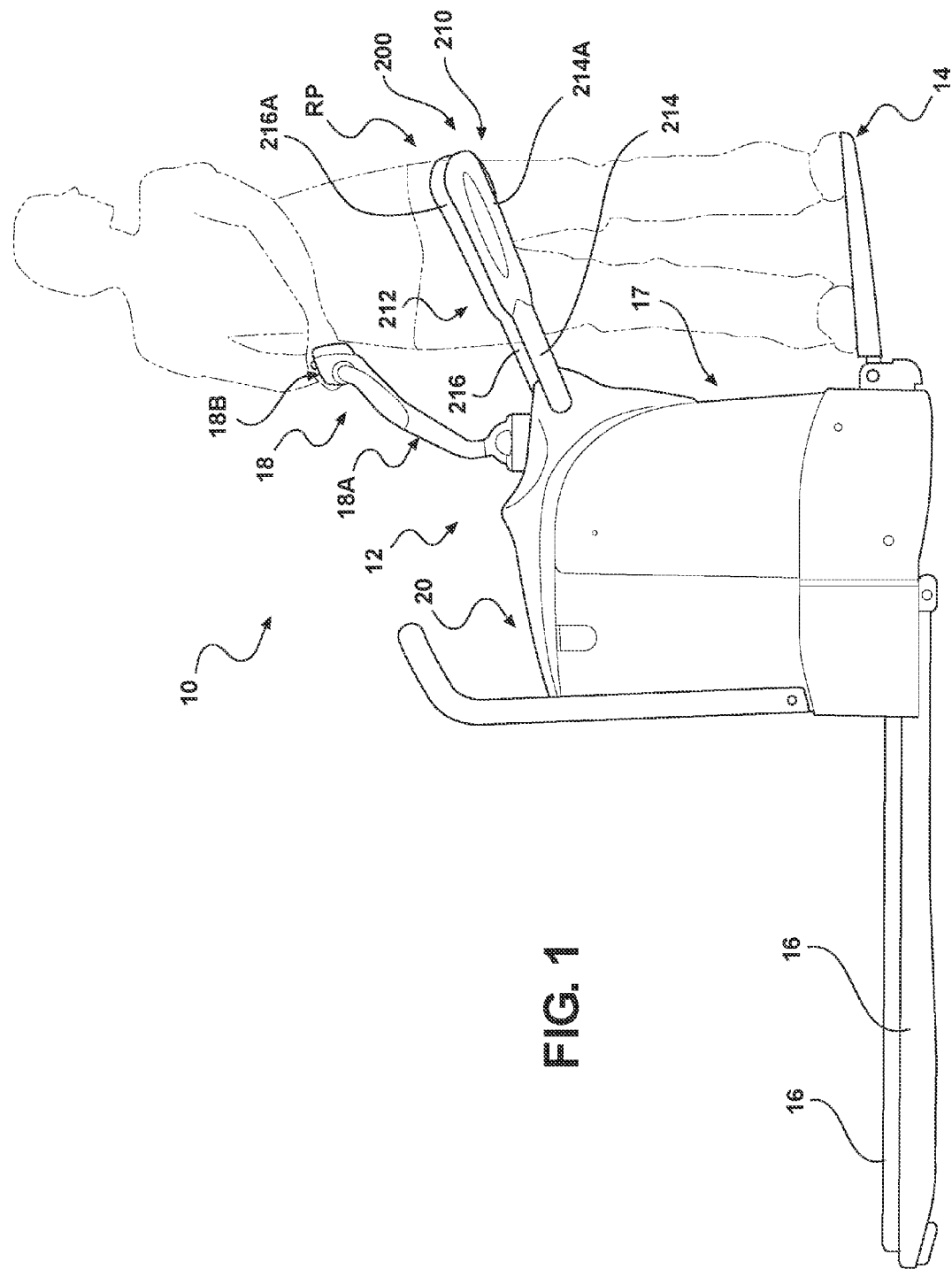
FIG. 1 is a side view of a walkie/rider pallet truck having a restraint structure constructed in accordance with the present invention, wherein the restraint structure is shown in a rider-driving position.
Figure 2:
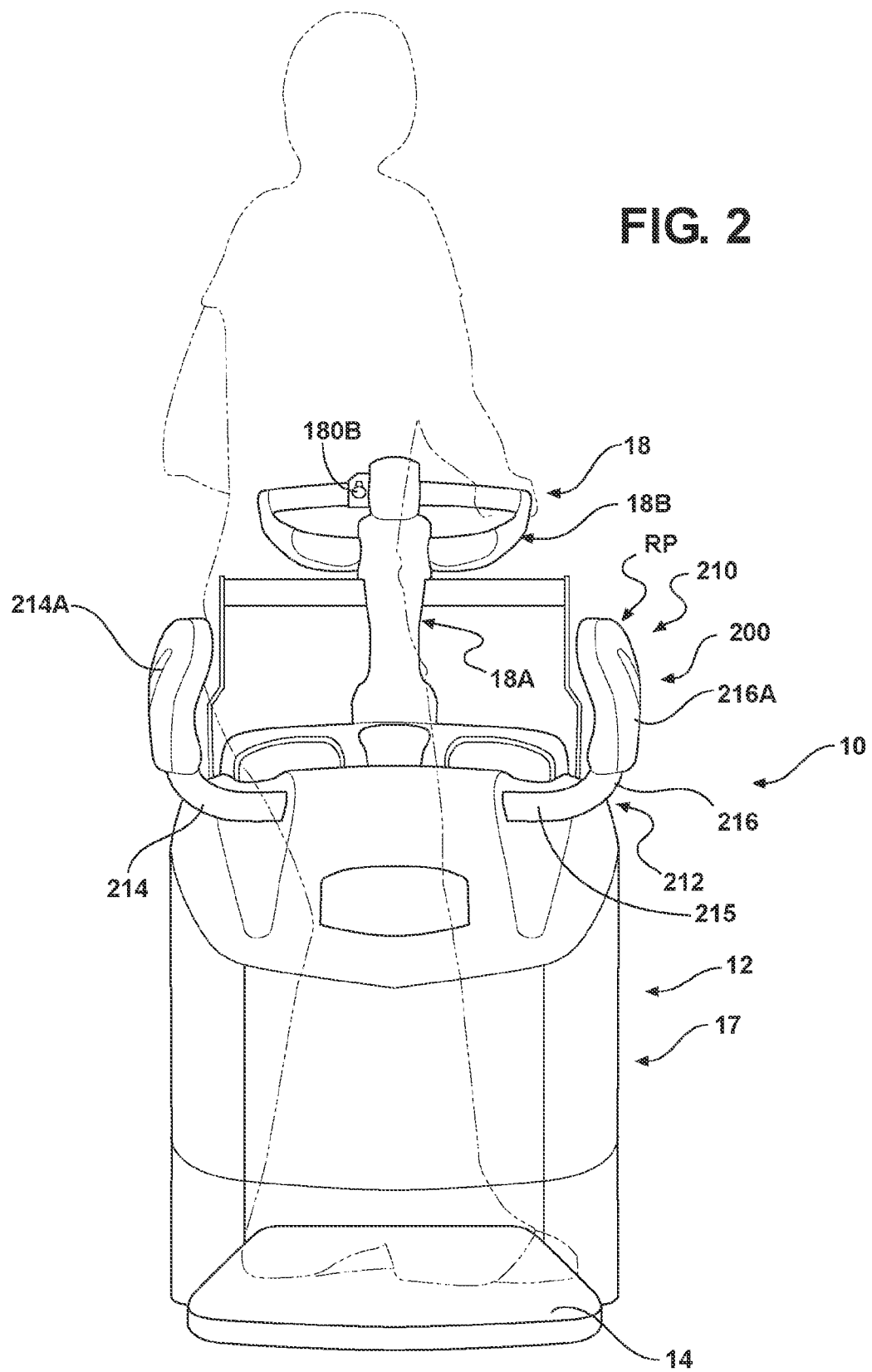
FIG. 2 is a front view of the truck illustrated in FIG. 1.
Figure 3:
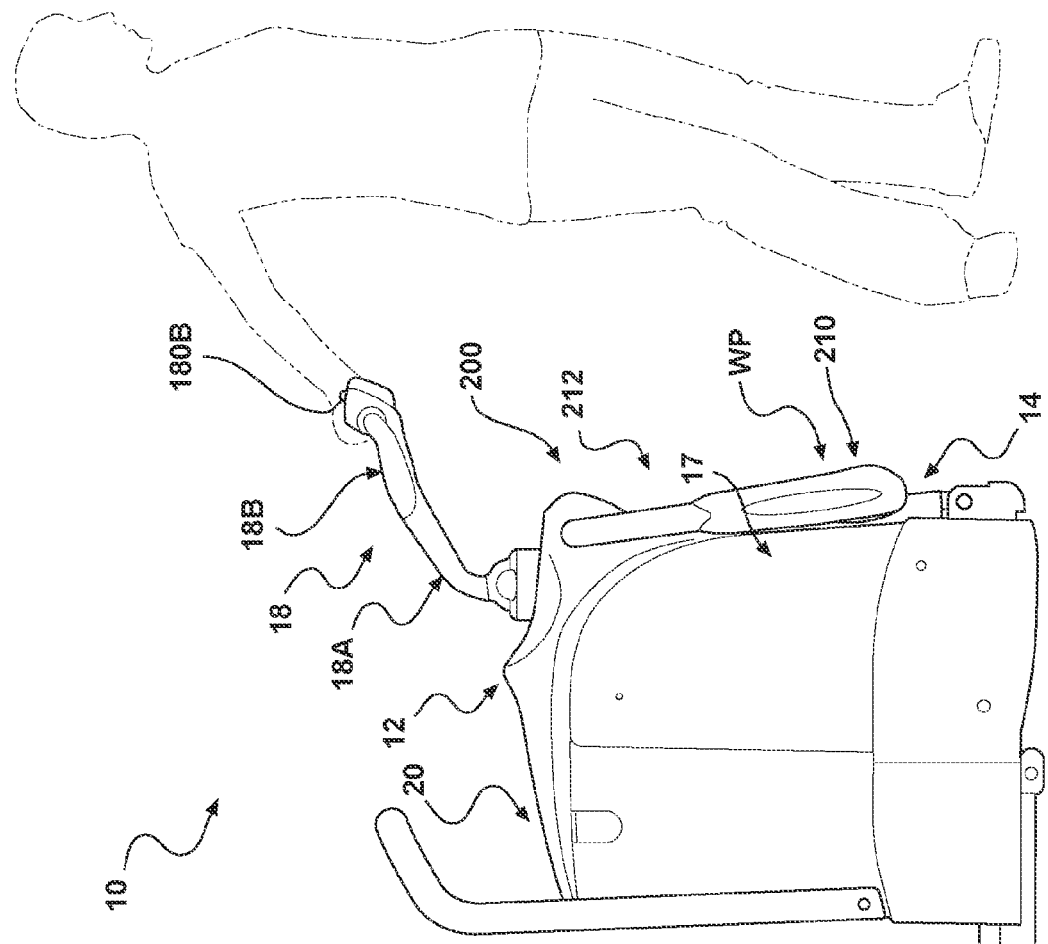
FIG. 3 is a side view similar to FIG. 1 illustrating the restraint structure in a walkie position.
Figure 4:
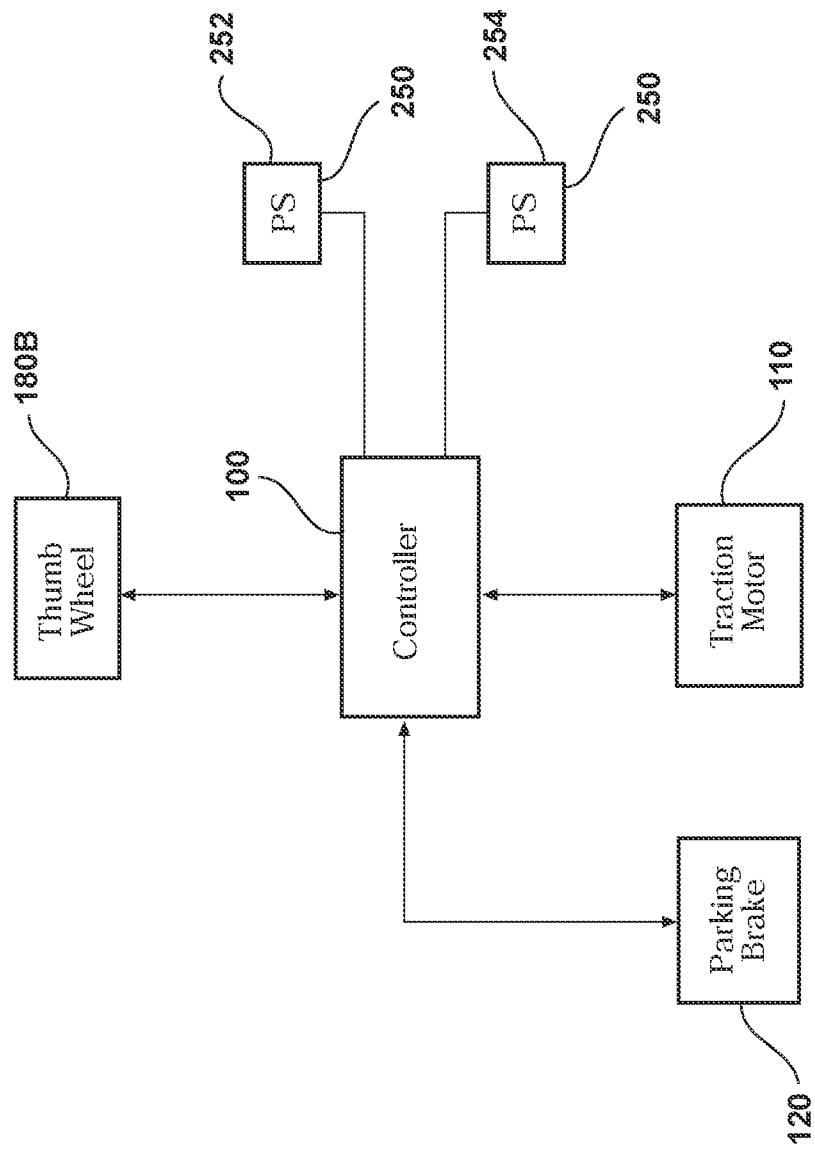
FIG. 4 is a schematic diagram illustrating a controller, a thumb wheel, a traction motor, a parking brake and sensor apparatus of the truck illustrated in FIG. 1.

FIGS. 1-3 illustrate a walkie/rider pallet truck 10 operable in accordance with the present invention. The pallet truck 10 comprises a power unit 12, a platform 14 pivotally coupled to the power unit 12, and a pair of load carrying forks 16 that extend rearwardly from the power unit 12. The platform 14 is capable of being positioned in a stowed, up position, see FIG. 3, and in a down position, see FIGS. 1 and 2. When in the down position, an operator may stand on the platform 14 so as to travel with the truck 10. The power unit 12 comprises a main housing 17, a steering control unit 18 coupled to the main housing 17, a steerable wheel (not shown), which, in the illustrated embodiment, is located generally beneath the steering control unit 18, a battery compartment 20 for storing one or more batteries that supply electrical power to the truck 10 and a controller 100 located in the main housing 17, see FIGS. 1-4. The power unit 12 also comprises an electric traction motor 110. The steering control unit 18 is coupled to the traction motor 110 to effect rotational movement of the traction motor 110. The traction motor 110 is, in turn, coupled to a gear box (not shown), wherein the gear box is coupled to the steerable wheel for driving the steerable wheel. Rotational movement of the steering control unit 18 causes rotational movement of the traction motor 110 and the gear box, which effects steering of the steerable wheel. The traction motor 110 in the illustrated invention is capable of effecting regenerative braking. The power unit 12 further comprises a conventional parking brake 120, see FIG. 4, which is spring applied and electromagnetically released, and mounted directly to the traction motor 110. The traction motor 110 and parking brake 120 are coupled to the controller 100 and define in the illustrated embodiment a drive/braking system. A pair of caster wheels (not shown) may be coupled to opposing corner portions of the power unit main housing 17 near the platform 14.

It is also contemplated that the steering control unit 18 may be coupled to the steerable wheel via a steer-by-wire system such that a direct mechanical coupling between the steering control unit 18 and the steerable wheel is not provided. In such an embodiment, a sensor (not shown) senses rotational movement of the steering control unit 18 and generates a steer control signal to a controller. Based on the steer control signal, the controller controls the operation of a steering motor (not shown) for effecting steering of the steerable wheel. It is still further contemplated that other braking systems may be employed instead of the drive/braking system of the illustrated embodiment, which drive/braking system comprises braking via the traction motor 110 and the parking brake 120. For example, a conventional disk braking system could be employed or any combination of traction motor regenerative braking, disk braking and/or braking via a parking brake may be provided.

The steering control unit 18 comprises a steering arm 18A, a handle 18B mounted at the end of the steering arm 18A and structure (not shown) coupling the steering arm 18A to the steerable wheel. The handle 18B comprises operational controls necessary for operating the truck 10. In the illustrated embodiment, the handle 18B comprises a forward/reverse thumb wheel 180B, which thumb wheel 180B is also coupled to the controller 100. When rotated in a forward direction, the thumb wheel 180B generates a forward control signal to the controller 100 and when rotated in a reverse direction, the thumb wheel 180B generates a reverse control signal to the controller 100. The controller 100 generates drive control signals to the traction motor 110. For example, in response to receiving a forward control signal from the thumb wheel 180B, the controller 100 will cause the traction motor 110 to rotate in a forward direction if the truck 10 is stopped or, if the truck 10 is already moving in the forward direction, cause the traction motor 110 to operate in the forward direction at a speed proportional to the amount of rotation of the thumb wheel 180B. If the truck 10 is moving in a reverse direction and the controller 100 receives a forward control signal from the thumb wheel 180B, the controller 100 will effect regenerative braking until the truck 10 is no longer moving in the reverse direction. Once the truck is no longer moving in the reverse direction and presuming the controller 100 is still receiving a forward control signal from the thumb wheel 180B, the controller 100 will cause the traction motor 110 to rotate in the forward direction to effect movement of the truck 10 in the forward direction at a speed proportional to the amount of rotation of the thumb wheel 180B.

In response to receiving a reverse control signal from the thumb wheel 180B, the controller 100 will cause the traction motor 110 to rotate in a reverse direction if the truck 10 is stopped or, if the truck 10 is already moving in the reverse direction, cause the traction motor 110 to operate in the reverse direction at a speed proportional to the amount of rotation of the thumb wheel 180B. If the truck 10 is moving in the forward direction and the controller 100 receives a reverse control signal from the thumb wheel 180B, the controller 100 will effect regenerative braking until the truck 10 is no longer moving in the forward direction. Once the truck is no longer moving in the forward direction and presuming the controller 100 is still receiving a reverse control signal from the thumb wheel 180B, the controller 100 will cause the traction motor 110 to rotate in the reverse direction to effect movement of the truck 10 in the reverse direction at a speed proportional to the amount of rotation of the thumb wheel 180B.

The thumb wheel 180B generates a neutral control signal to the controller 100 when the thumb wheel 180B is in a neutral, home position. The controller 100 may effect regenerative braking via the traction motor 110 when the truck 10 is moving and the thumb wheel 180B is returned to its neutral, home position. In the illustrated embodiment, regenerative braking via the traction motor 110 continues for a short period of time after the truck 10 has stopped. Thereafter, the parking brake 120, see FIG. 4, may be applied to hold the truck 10 in its stopped position.

The steering arm 18A pivots about the power unit main housing 17 so as to effect rotation of the steerable wheel. See U.S. Pat. Nos. 6,464,025 and 7,017,689, the entire disclosures of which are incorporated by reference herein. Movement of the steering arm 18A from side to side allows the angle of the steerable wheel and direction of travel of the truck 10 to be controlled.

Figure 6:
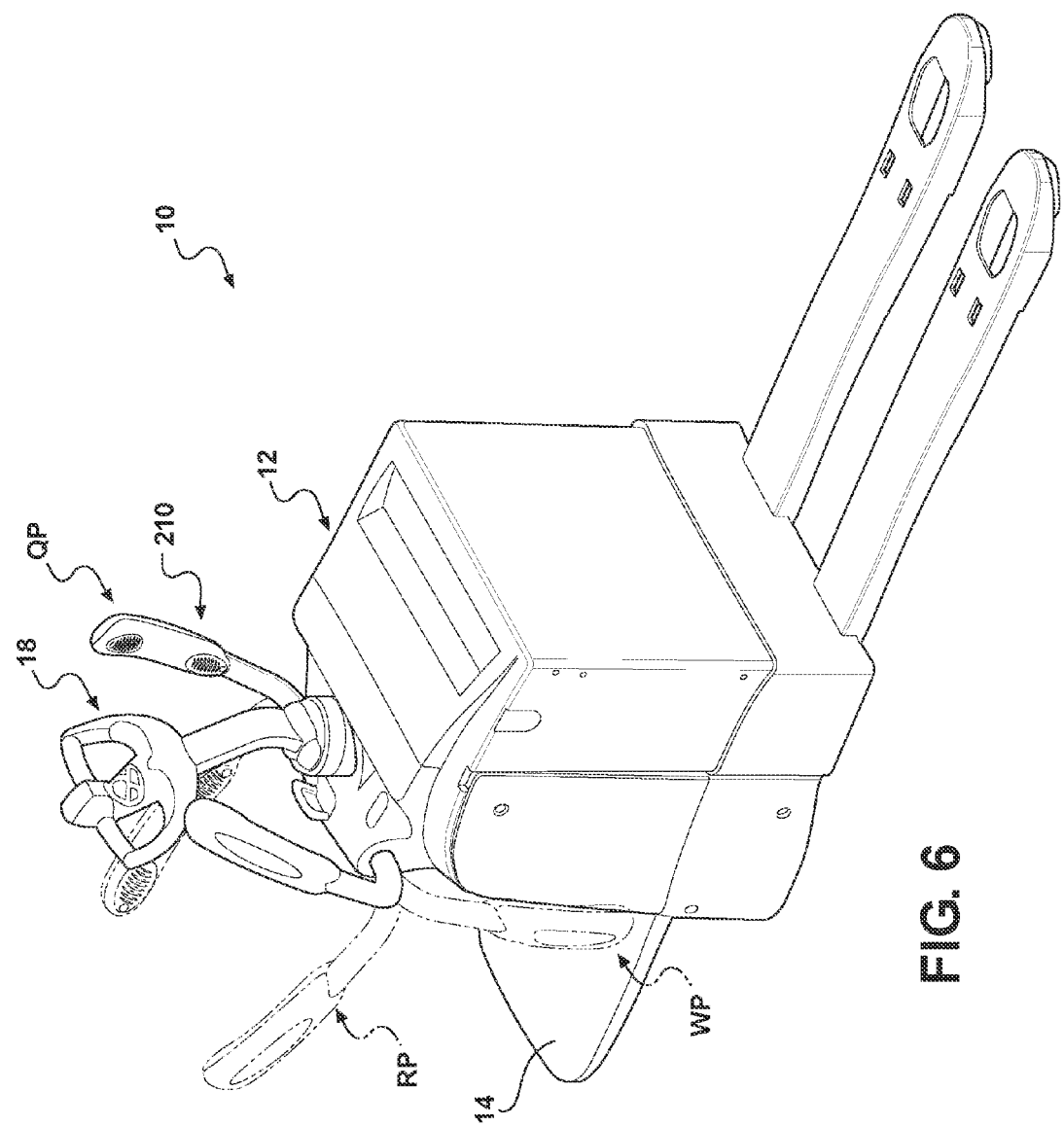
FIGS. 6 and 7 are perspective and side views, respectively, of the truck illustrated in FIG. 1 with the restraint structure shown concurrently in the walkie position, the rider-driving position, and a quick-exit position.
Figure 7:
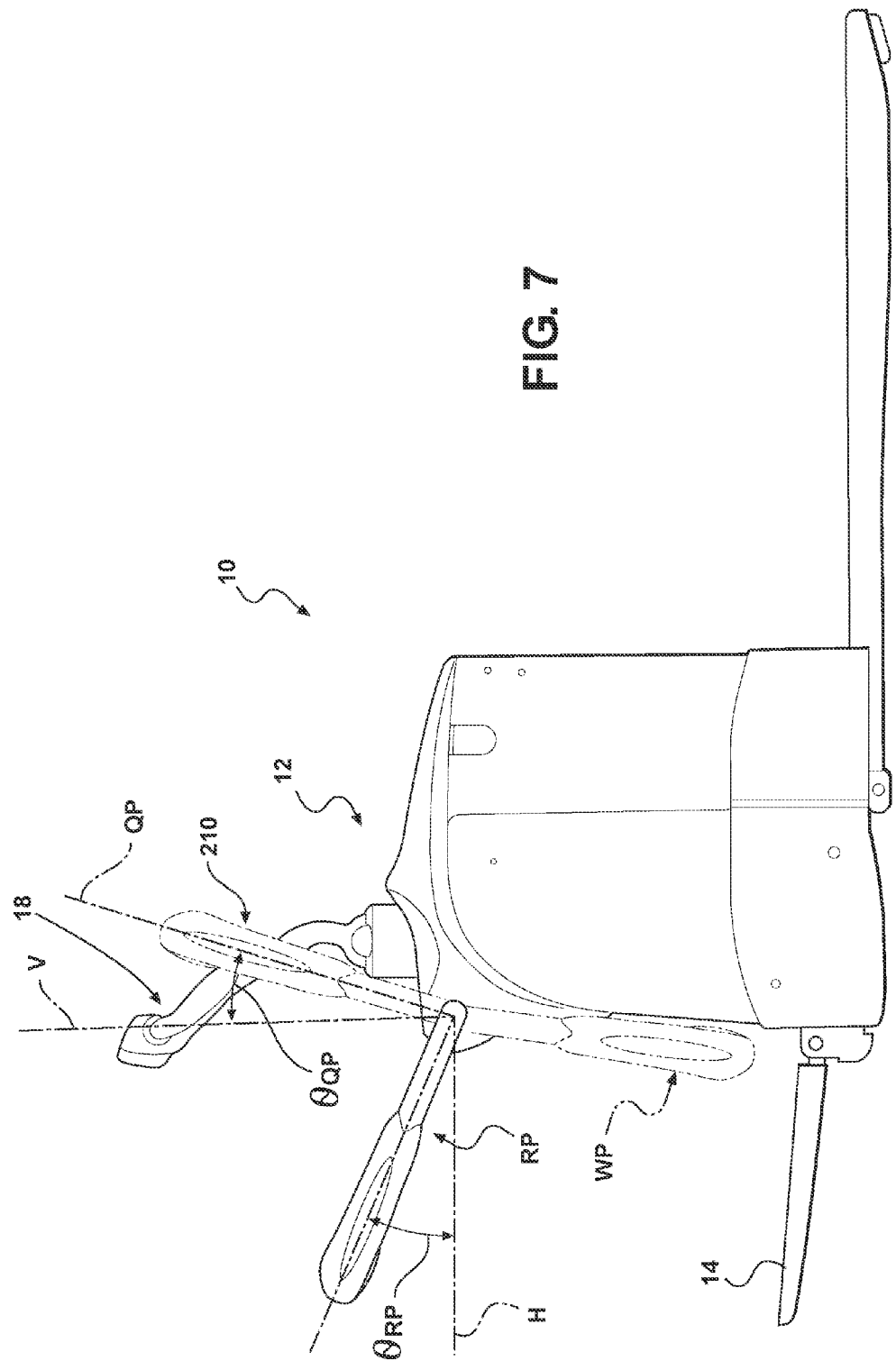
Figure 10:
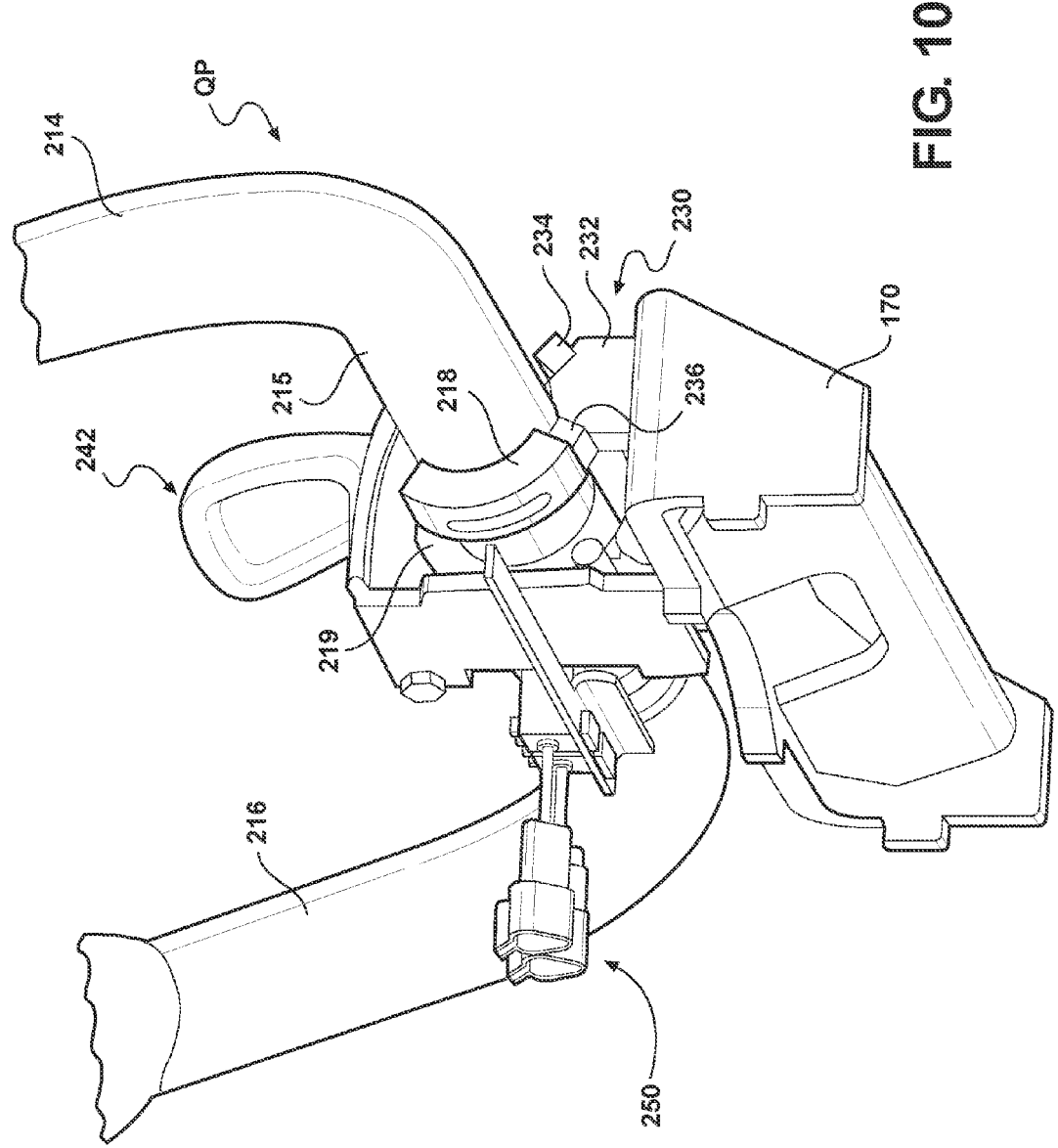
FIG. 10 is a perspective view illustrating the restraint structure in the quick-exit position where the first stop member on the restraint structure is in engagement with a second resilient stop.

In accordance with the present invention, the truck 10 further comprises a restraint system 200 comprising a restraint structure 210 pivotally coupled to the power unit main housing 17. In the illustrated embodiment, the restraint structure 210 comprises a U-shaped tubular structure 212 having first and second leg members 214 and 216 provided with first and second pads 214A and 216A. An intermediate member 215 extends between and connects with the leg members 214 and 216. In the illustrated embodiment, the restraint structure 210 is movable to one of the following three positions: a walkie position WP, see FIG. 3, a rider-driving position RP, see FIGS. 1 and 2, and a quick-exit position QP, see FIG. 10. In each of FIGS. 6 and 7, the restraint structure 210 is shown concurrently in all three positions, namely, the walkie position WP (shown in phantom in FIGS. 6 and 7), the rider-driving position RP (shown in phantom in FIG. 6 and solid line in FIG. 7), and the quick-exit position QP (shown in solid line in FIG. 6 and phantom in FIG. 7), so as to allow the reader to compare and contrast the three positions more easily. It is noted that only a single restraint structure 210 is provided in the illustrated embodiment, which structure 210 can be positioned in only one of the three positions, namely, the walkie position WP, the rider-driving position RP, and the quick-exit position QP, at any given point in time.

An operator moves the restraint structure 210 to the walkie position WP and the platform 14 to its stowed, up position when the operator intends to walk alongside the truck 10, such as when the operator is picking/retrieving stock at closely spaced locations. As is apparent from FIGS. 3 and 7, when the restraint structure 210 is in the walkie position WP, it is located in a downward, stowed position adjacent to the power unit main housing 17.

An operator moves the restraint structure 210 to the rider-driving position RP and the platform 14 to its down position when the operator intends to step onto the platform 14 to ride on the truck 10 when the distance between pick locations is longer. As is apparent from FIG. 7, when the restraint structure 210 is in the rider-driving position RP, it is located in an outwardly, extended position so as to be slightly above horizontal H, i.e., at an angle $\theta_{RP}$ to horizontal H, wherein the angle $\theta_{RP}$ may fall within a range of from about 0 degrees to about 35 degrees. The first and second leg members 214 and 216 of the U-shaped tubular structure 212 are intended to extend along opposing sides of an operator when the operator is standing on the platform 14 and the restraint structure 210 is in the rider-driving position RP, see FIGS. 1 and 2. The first and second pads 214A and 216A may be made from an energy absorbing material so as to provide a comfortable surface/structure against which the operator may lean/engage while on the platform 14, see FIG. 2.

An operator moves the restraint structure 210 to the quick-exit position QP when the operator intends to quickly step off a side or rear portion of the platform 14, for example, to move toward the forks 16 to add an item to or remove an item from the forks 16 or to scan or adjust a load on the forks 16, and then quickly return to the platform 14. As is apparent from FIG. 7, when the restraint structure 210 is located in the quick-exit position QP in the illustrated embodiment, it is positioned upward and slightly beyond vertical V, i.e., on a side of vertical V opposite the operator, and at an angle $\theta_{QP}$ to vertical, wherein the angle $\theta_{QP}$ may fall within a range of from about 0 degrees to about 25 degrees. Because the restraint structure 210 is located at a slight angle $\theta_{QP}$ to vertical, an operator can quickly and easily return the restraint structure 210 to the rider-driving position RP once the operator returns to the platform 14. As discussed above, it is believed that prior art restraint structures were positionable in either a stowed position or a rider-driving position. The present invention is believed to be advantageous over the prior art structures since the restraint structure 210 of the present invention is capable of being moved from the quick-exit position downwardly under the influence of gravity to the rider-driving position RP. This is in contrast to the prior art U-shaped restraint structures which required an operator to bend over and lift a U-shaped restraint structure from a downward stowed position to the rider-driving position or reach out over the power unit main housing and lift up a restraint structure from a stowed position out over the power unit main housing. The present invention is also believed to be advantageous over the prior restraint structures comprising a pair of inwardly foldable restraint members since an operator need not step back prior to moving the restraint structure of the present invention from the rider driving position to the quick-exit position and vice versa.

Figure 5:
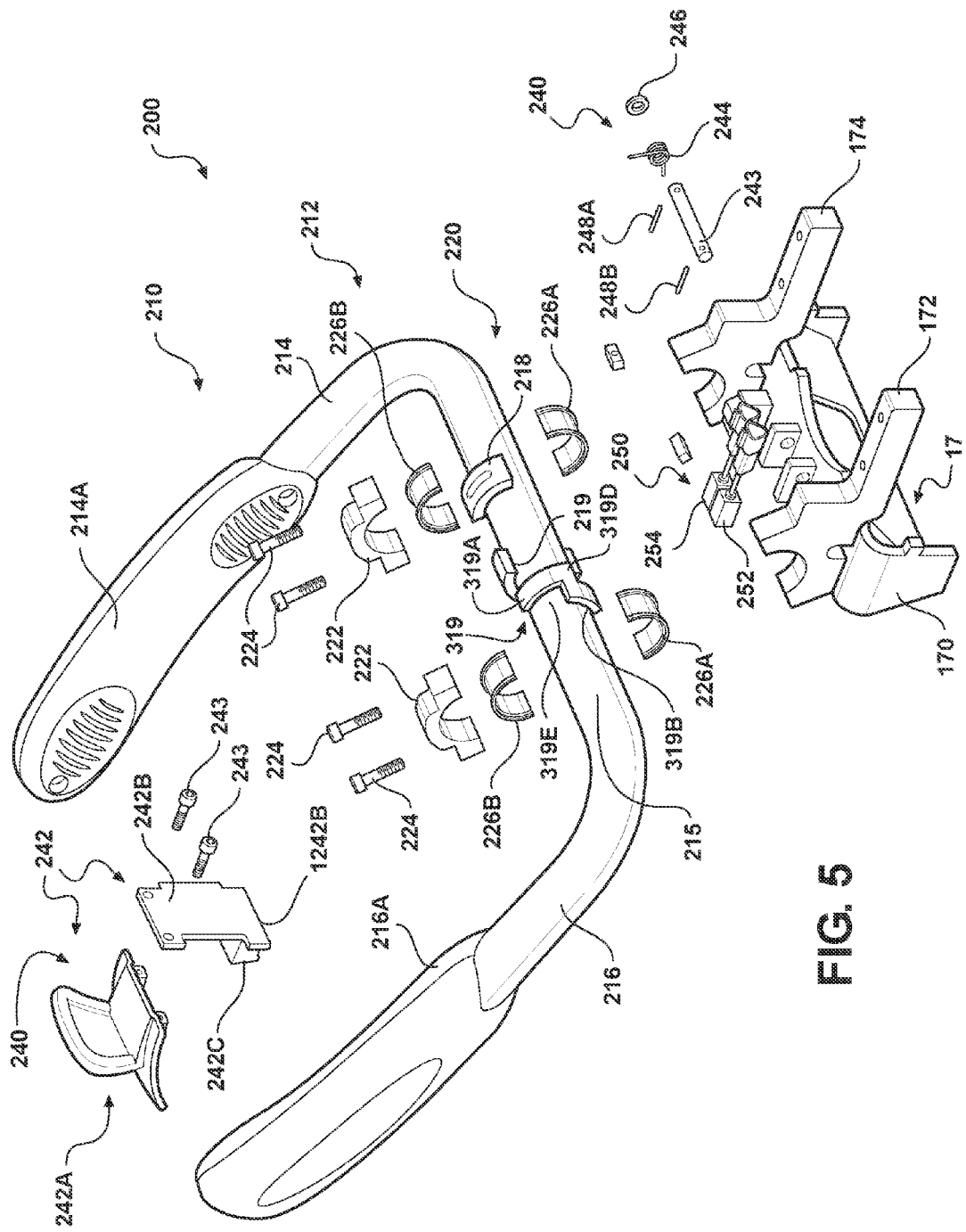
FIG. 5 is an exploded view of a restraint system including the restraint structure of the truck illustrated in FIG. 1.
Figure 8:
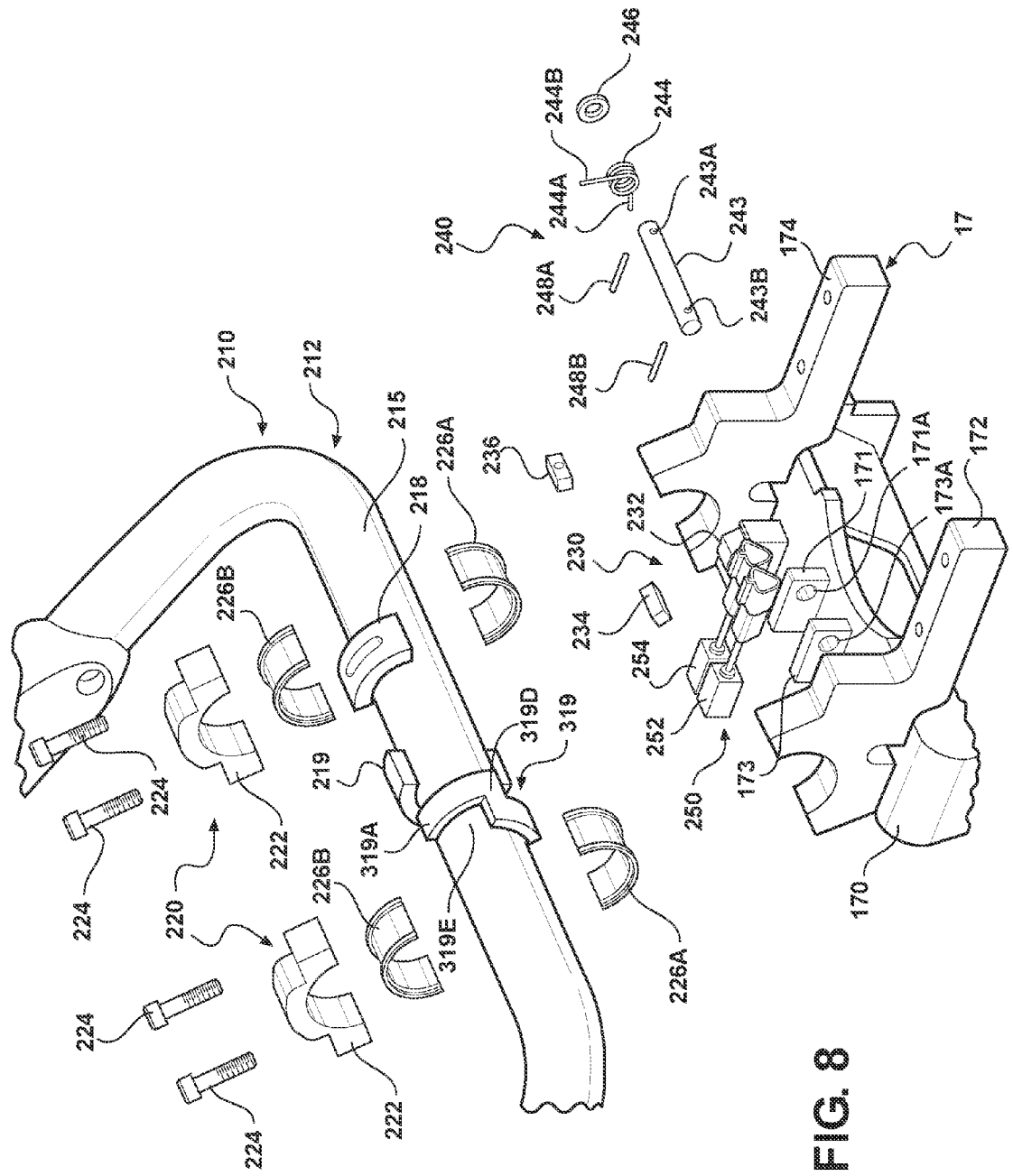
FIG. 8 is an enlarged, exploded view of a portion of the restraint system illustrated in FIG. 5.
Figure 9:
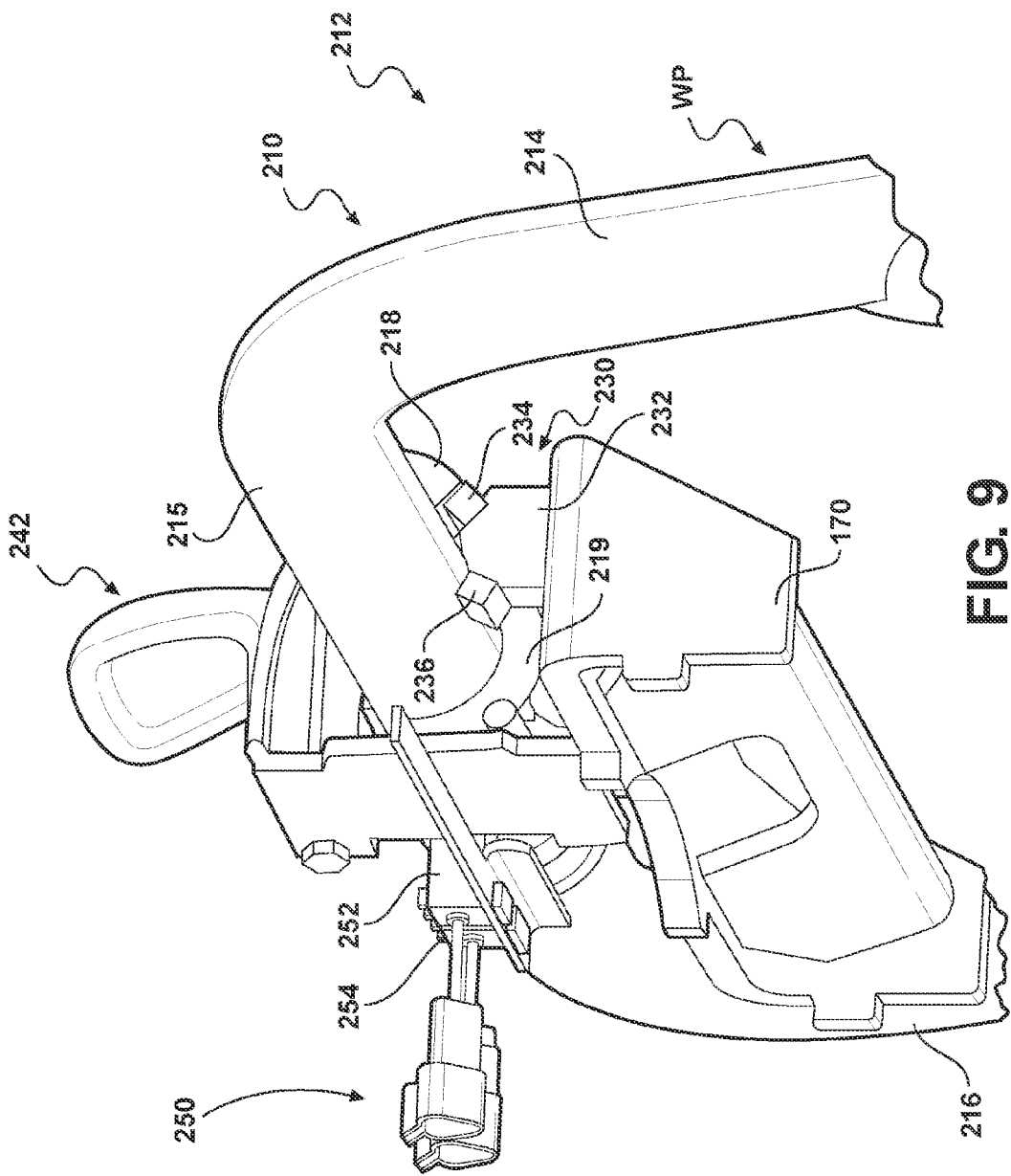
FIG. 9 is a perspective view illustrating the restraint structure in the walkie position and where a first stop member on the restraint structure is in engagement with a first resilient stop.

The restraint system 200 further comprises coupling apparatus 220 for pivotally coupling the restraint structure 210 to the power unit main housing 17, see FIGS. 5 and 8. The power unit main housing 17 comprises a frame 170 and first and second brackets 172 and 174, which brackets 172 and 174 are bolted, welded or otherwise fixedly coupled to the frame 170 (the brackets 172 and 174 are not illustrated in FIGS. 9 and 10). The U-shaped tubular structure 212 is pivotally coupled to the first and second brackets 172 and 174 via metal clamps 222 and bolts 224. Polymeric bushings 226A, such as nylon bushings, are provided between the U-shaped tubular structure 212 and the first and second brackets 172 and 174 and further nylon bushings 226B are provided between the U-shaped tubular structure 212 and the metal clamps 222.

The restraint system 200 also comprises stop structure 230 comprising a stop block 232 for supporting first and second resilient stops 234 and 236, see FIGS. 5, 8-10. The stop block 232 is fixed to the frame 170. A first stop member 218 is fixedly coupled to the intermediate member 215 of the restraint structure 210, see FIGS. 5, 8-10. The first resilient stop 234 is engaged by the first stop member 218 when the restraint structure 210 is located in the walkie position WP, see FIG. 9. Hence, the first stop member 218 and the first resilient stop 234 define the angular position of the restraint structure 210 relative to the power unit main housing 17 when the restraint structure 210 is positioned in the walkie position WP. The second resilient stop 236 is engaged by the first stop member 218 when the restraint structure 210 is located in the quick-exit position QP, see FIG. 10. Hence, the first stop member 218 and the second resilient stop 236 define the angular position of the restraint structure 210 relative to the power unit main housing 17 when the restraint structure 210 is positioned in the quick-exit position QP.

Figure 11:
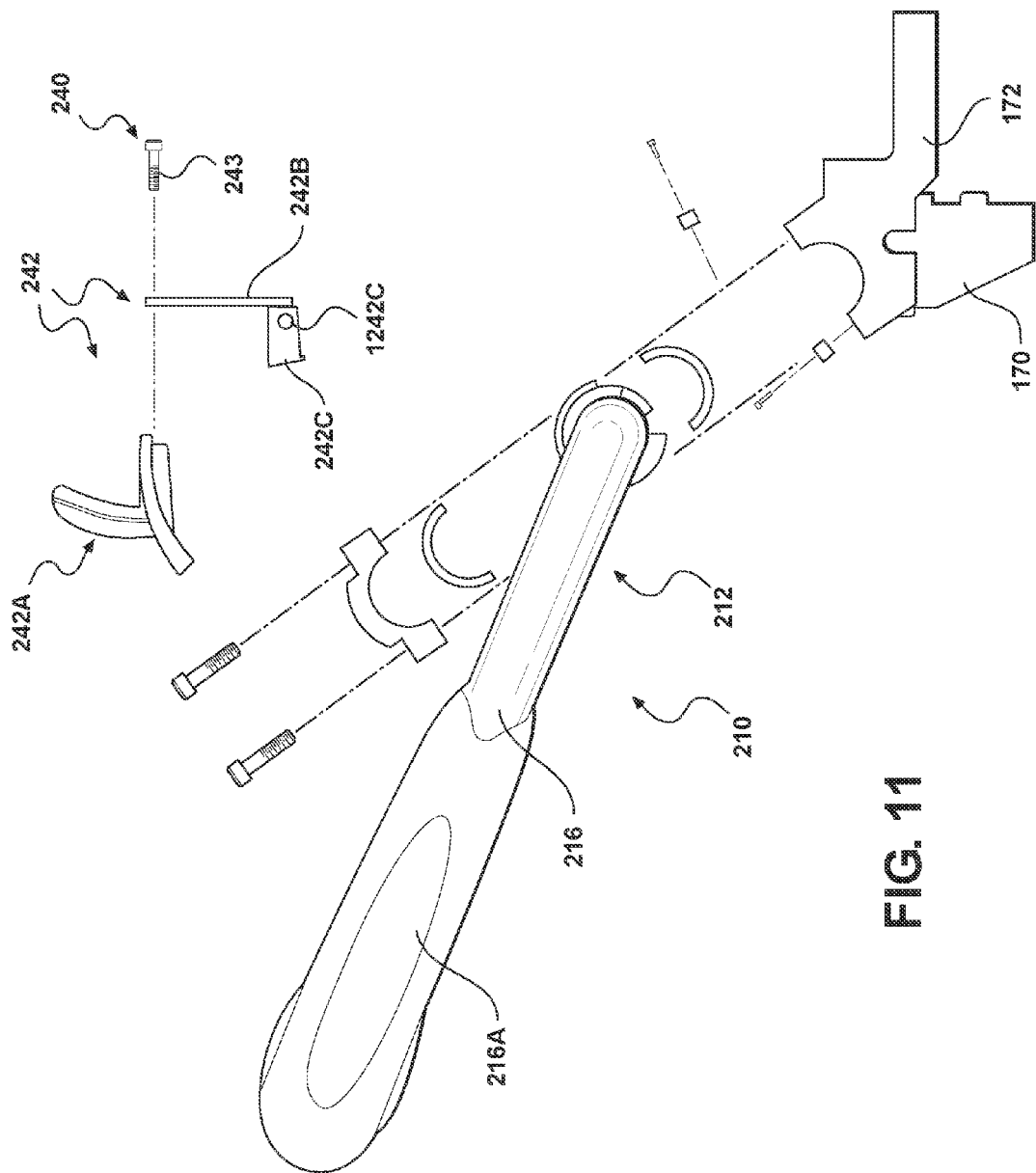
FIG. 11 is a side, exploded view of the restraint system of the present invention.
Figure 12:
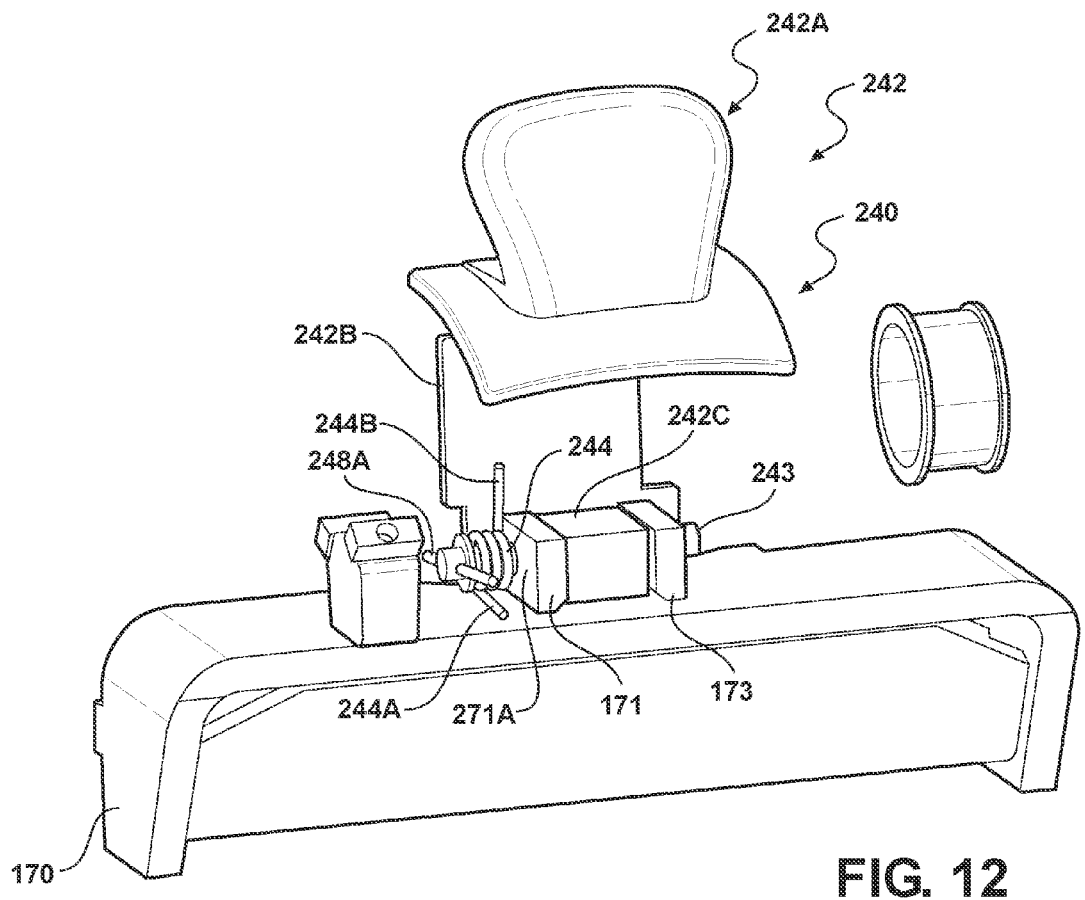
FIG. 12 is a perspective view of a locking mechanism of the restraint system.

The restraint system 200 further comprises a mechanism 240 for releasably locking the restraint structure 210 in the rider-driving position RP. The locking mechanism 240 comprises a pivotable lever 242 comprising a gripping section 242A, a side wall 242B coupled to the gripping section 242A via bolts 243 and a connector block 242C integral with the side wall 242B, see FIGS. 5 and 11-16. The connector block 242C is provided with a bore 1242C extending completely through the connector block 242C, see FIG. 11. The frame 170 comprises first and second connector walls 171 and 173, each provided with a bore 171A and 173A, see FIG. 8. The first and second connector walls 171 and 173 are not illustrated in FIGS. 13-16. The locking mechanism 240 further comprises a shaft 243, a coil spring 244 having first and second legs 244A and 244B, a washer 246 and first and second connector pins 248A and 248B, see FIGS. 5 and 8. To couple the pivotable lever 242 to the frame 170, the lever connector block 242C is positioned between the first and second frame connector walls 171 and 173. Next, the shaft 243 is inserted through the bores 171A and 173A in the first and second connector walls 171 and 173 and the bore 1242C in the connector block 242C, see FIG. 12. The spring 244 is then positioned about the shaft 243 so as to be adjacent an outer side wall 271A of the first connector wall 171 followed by the washer 246 being located on the shaft 243 adjacent to the spring 244, see FIG. 12. To prevent the shaft 243 from moving out from the first and second connector walls 171 and 173 and the connector block 242C, the first and second connector pins 248A and 248B are inserted into respective bores 243A and 243B in the shaft 243. As is apparent from FIG. 12, the first leg 244A of the spring 244 engages the frame 170 while the second leg 244B of the spring 244 engages the side wall 242B of the pivotable lever 242 so as to bias the pivotable lever 242 in a direction away from the operator, counter-clockwise in FIGS. 1, 3 and 12. The spring 244 biases the pivotable lever 242 to a home position as shown in FIGS. 13 and 13A, wherein a lower edge 1242B of the side wall 242B engages the frame 170 so as to limit the amount of angular rotation of the lever 242 about the shaft 243.

Figure 13A:
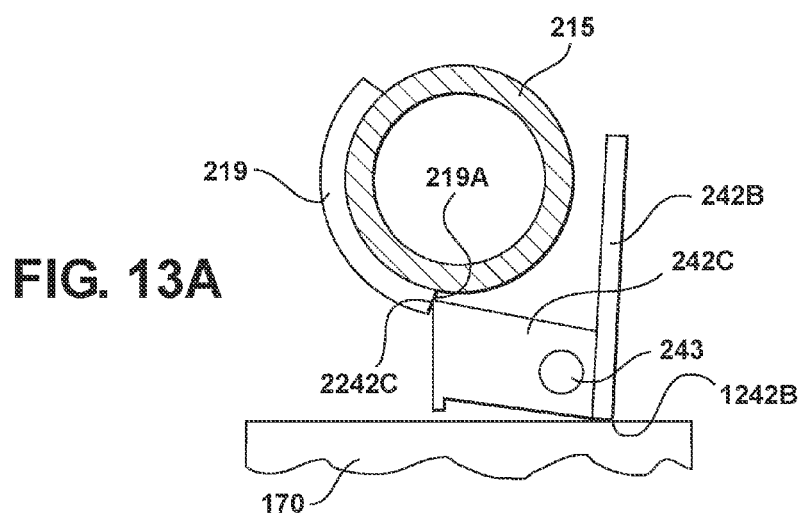
FIG. 13A is a side view, partially in cross section, of the pivotable lever of the locking mechanism in engagement with the second stop member coupled to the restraint structure for maintaining the restraint structure in a rider-driving position.
Figure 13:
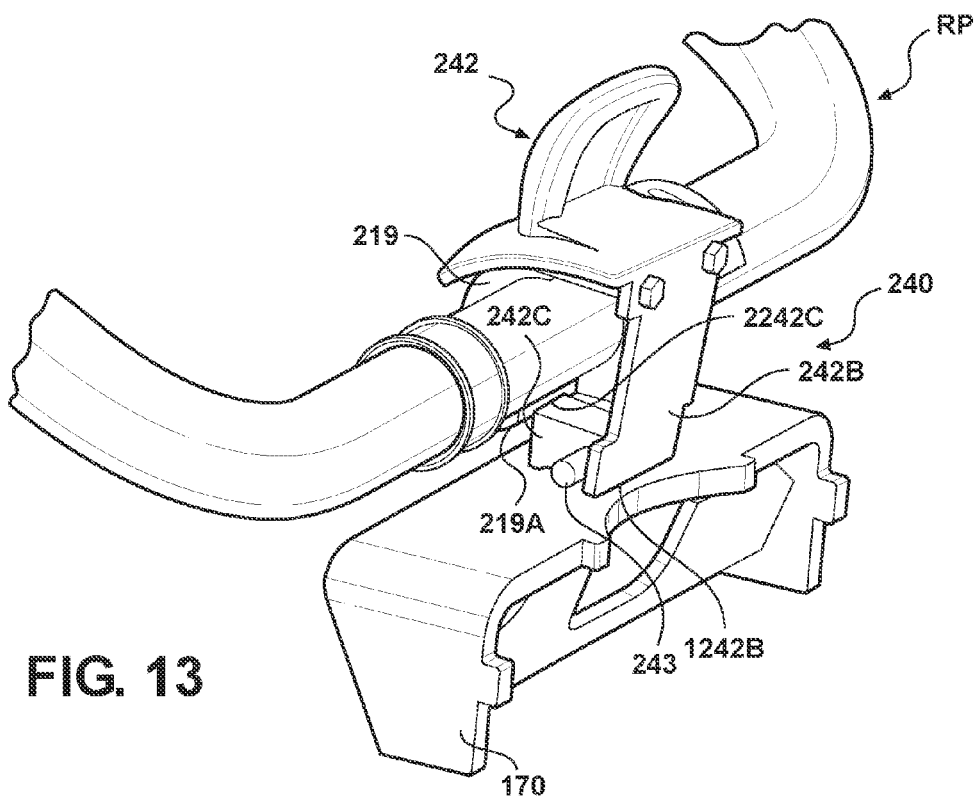
FIG. 13 is a perspective view illustrating a pivotable lever of the locking mechanism illustrated in FIG. 12 in engagement with a second stop member coupled to the restraint structure for maintaining the restraint structure in a rider-driving position.

The pivotable lever connector block 242C comprises an upper front edge 2242C which defines an engagement member, see FIGS. 13 and 13A. A second stop member 219 is fixedly coupled to the intermediate member 215 of the restraint structure 210, see FIGS. 5, 8-10 and 13-16. The second stop member 219 is located on the intermediate member 215 such that when the restraint structure 210 is located in the rider-driving position RP, a first edge 219A of the second stop member 219 is positioned adjacent the upper front edge 2242C of the pivotable lever connector block 242C, see FIGS. 13 and 13A. The first edge 219A of the second stop member 219 is engaged by the upper front edge 2242C of the pivotable lever connector block 242C when the pivotable lever 242 is located in its home position and the restraint structure 210 is located in the rider-driving position RP, see FIGS. 13 and 13A. The connector block 242C, by engaging the first edge 219A of the second stop member 219, functions to maintain/hold the restraint structure 210 in the rider-driving position RP.

Figure 14:
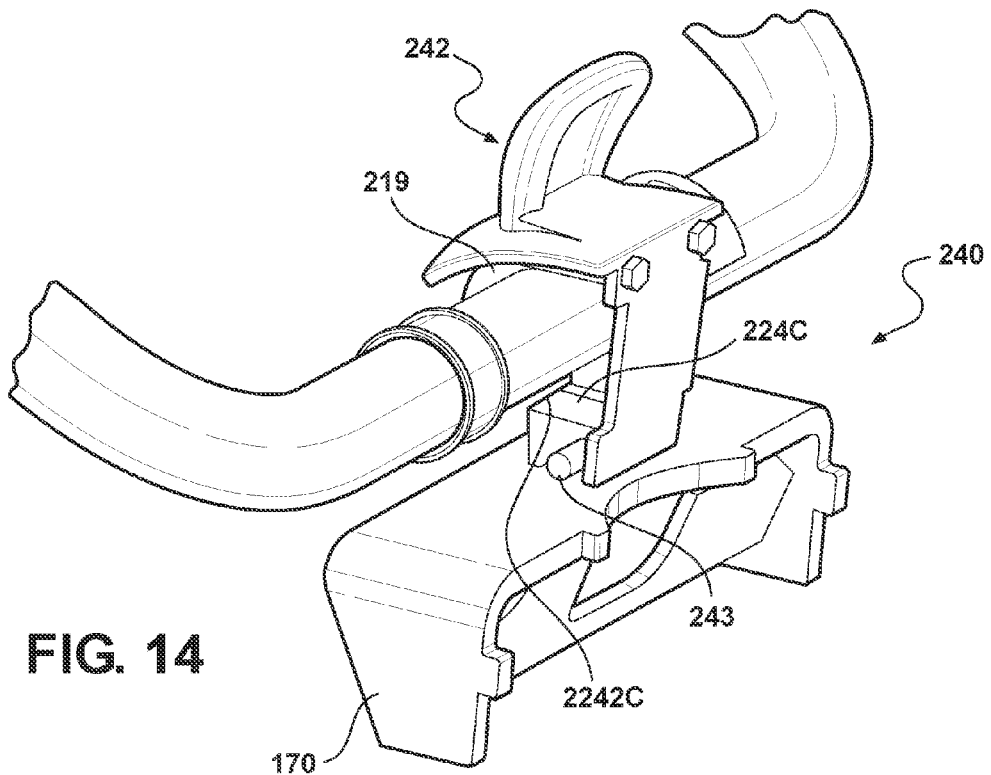
FIG. 14 is a perspective view illustrating the pivotable lever of the locking mechanism pivoted so as not to be in engagement with the second stop member coupled to the restraint structure.
Figure 16:
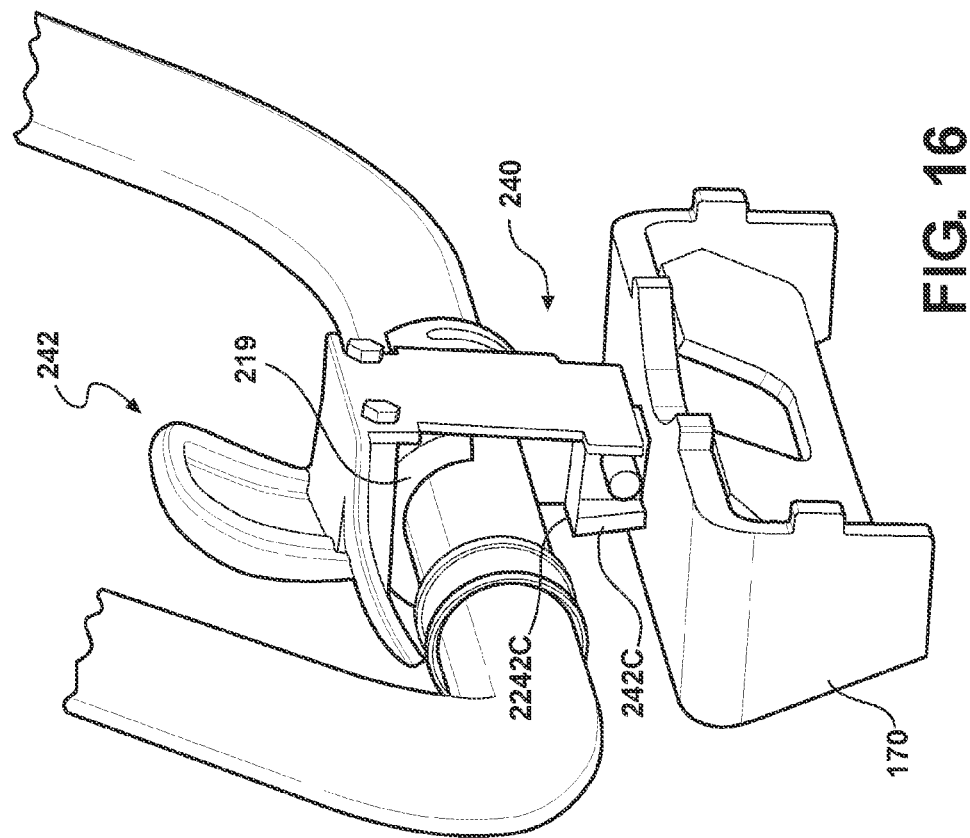
FIG. 16 is a perspective view of a portion of the restraint structure in the quick-exit position.
Figure 15:
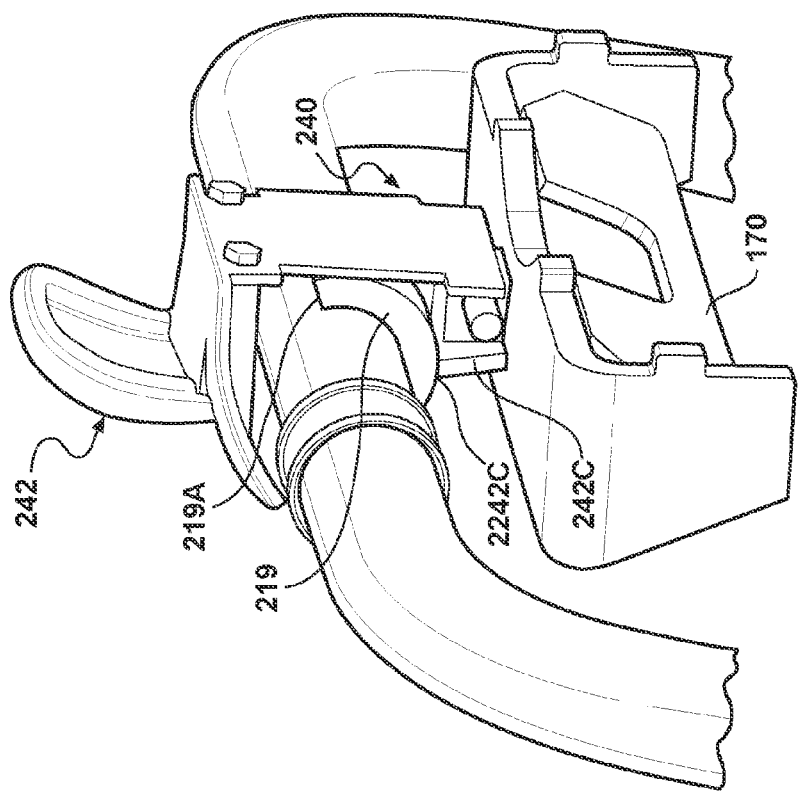
FIG. 15 is a perspective view of a portion of the restraint structure in the walkie position.

To move the restraint structure 210 from the rider-driving position RP to the walkie position WP, the operator need only pull the pivotable lever gripping section 242A in a direction away from the forks 16, i.e., pivot the lever 242 counter-clockwise in FIGS. 13, 13A against the bias of the spring 244, so as to release the upper front edge 2242C of the pivotable lever connector block 242C from engagement with the first edge 219A of the second stop member 219, see also FIGS. 14 and 15. To move the restraint structure 210 from the rider-driving position RP to the quick-exit position QP, the operator need only pivot the restraint structure 210 from the rider-driving position RP to the quick-exit position QP, see FIG. 16. There is no need to pivot the lever 242 when moving the restraint structure 210 from the rider-driving position RP to the quick-exit position QP.

To move the restraint structure 210 from the quick-exit position QP to the rider-driving position RP, the operator need only pivot the restraint structure 210 from the quick-exit position QP to the rider-driving position RP. There is no need to pivot the lever 242 when moving from the quick-exit position QP to the rider-driving position RP.

To move the restraint structure 210 from the walkie position WP to the rider-driving position RP, the operator need only pivot the restraint structure 210 from the walkie position WP to the rider-driving position RP. There is no need to pivot the lever 242 when moving from the walkie position WP to the rider-driving position RP. It is noted that the spring 244 will cause the pivotable lever 242 to move to its home position after the first edge 219A of the second stop member 219 has moved in a counter-clockwise direction as viewed in FIG. 15 and cleared the upper front edge 2242C of the pivotable lever connector block 242C.

The restraint system 200 further comprises sensor apparatus 250, see FIGS. 5 and 8-10, including, in the illustrated embodiment, first and second sensors 252 and 254, such as proximity sensors, which sensors 252 and 254 are coupled to the controller 100. A flag 319 is fixedly coupled to the intermediate member 215 of the restraint structure 210, see FIGS. 5 and 8. The flag 319 comprises first and second legs 319A-319B and a substantially horizontal intermediate section 319D. The first and second sensors 252 and 254 are supported by structure (not shown) within the power unit main housing 17 so as to be positioned near the flag 319, see FIG. 9.

Figure 17:
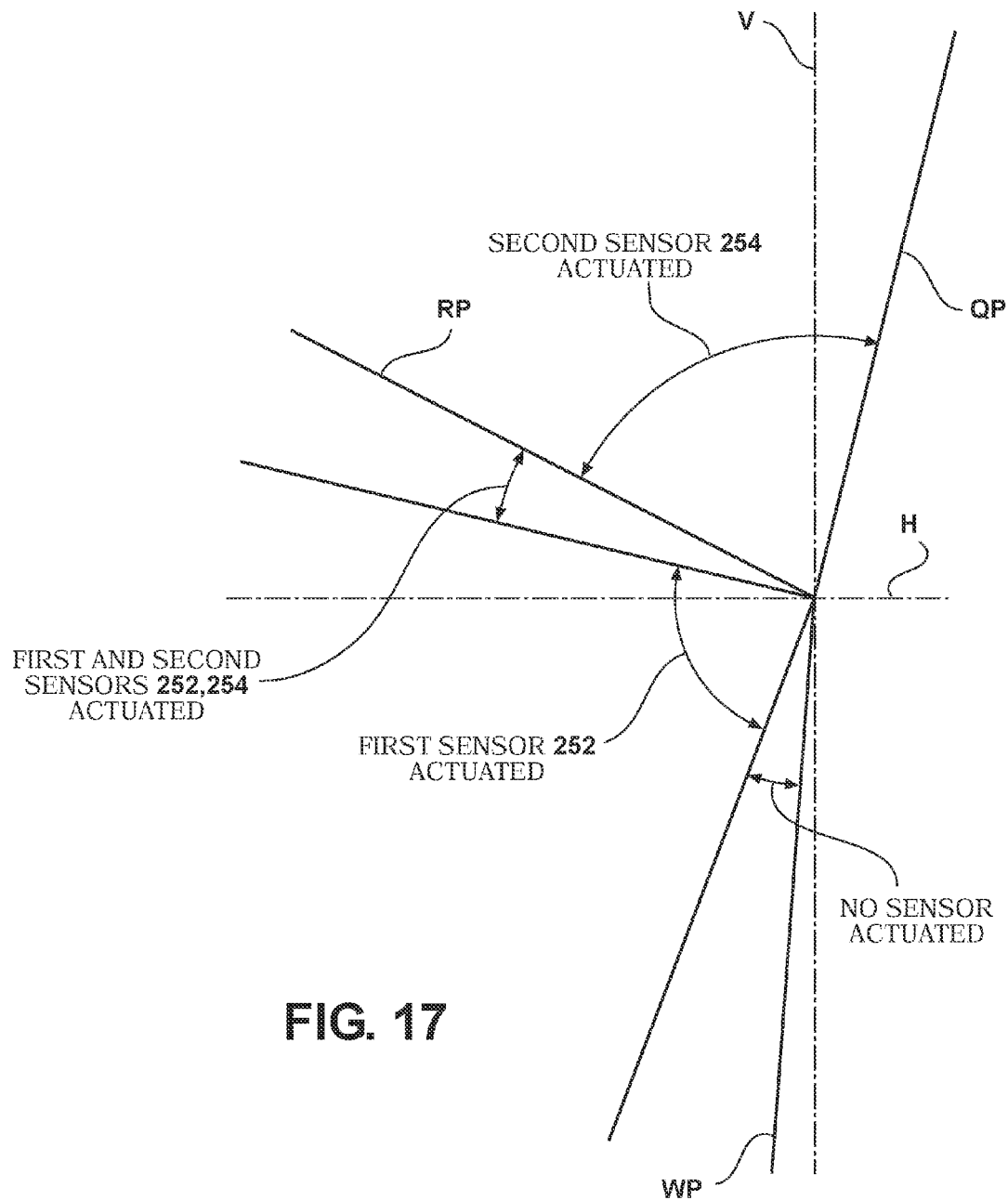
FIG. 17 is a schematic illustration of the three restraint structure positions, angular ranges between those three positions and notations of which of first and second sensors are actuated when the restraint structure is located or moved through those ranges.

When the restraint structure 210 is positioned in the quick-exit position QP, the first leg 319A of the flag 319 is positioned directly across from the second sensor 254 while a gap 319E next to the first leg 319A is positioned directly across from the first sensor 252. Hence, the second sensor 254 senses the first leg 319A while the first sensor 252 does not sense the flag 319. Hence, only the second sensor 254 is actuated and generates a corresponding actuation signal to the controller 100 while the first sensor 252 is not actuated and does not generate an actuation signal to the controller 100. See FIG. 17, which schematically illustrates the three positions of the restraint structure 210, namely, the walkie position WP, the rider-driving position RP, and the quick-exit position QP, and angular ranges between those three positions and indications of which of the first and second sensors 252 and 254 are actuated when the restraint structure 210 is located or moved through those ranges. The sensor apparatus 250 is deemed to generate a quick-exit position signal to the controller 100 when only the second sensor 254 is actuated and generates a corresponding actuation signal to the controller 100 while the first sensor 252 is not actuated and does not generate an actuation signal to the controller 100.

When the restraint structure 210 is positioned in the rider-driving position RP, the intermediate section 319D of the flag 319 is positioned directly across from the first and second sensors 252 and 254. Hence, both the first and second sensors 252 and 254 sense the intermediate section 319D of the flag 319 such that both sensors 252 and 254 are actuated and generate corresponding actuation signals to the controller 100, see FIG. 17. The sensor apparatus 250 is deemed to generate a rider-driving position signal to the controller 100 when both the first and second sensors 252 and 254 sense the intermediate section 319D of the flag 319.

When the restraint structure 210 is positioned in the walkie position WP, no portion of the flag 319 is positioned directly across from either the first sensor 252 or the second sensor 254. Hence, the first and second sensors 252 and 254 do not sense the flag 319, are not actuated and do not generate actuation signals to the controller 100, see FIG. 17. The sensor apparatus 250 is deemed to generate a walkie position signal to the controller 100 when the first and second sensors 252 and 254 are not actuated and do not generate actuation signals to the controller 100.

When the restraint structure 210 is positioned between the rider-driving position and the walkie position, the second leg 319B of the flag 319 is positioned directly across from the first sensor 252 while no portion of the flag 319 is positioned directly across from the second sensor 254. Hence, the first sensor 252 senses the flag second leg 319B while the second sensor 254 does not sense the flag 319. Hence, only the first sensor 252 is actuated and generates a corresponding actuation signal to the controller 100 while the second sensor 254 is not actuated and does not generate an actuation signal to the controller 100, see FIG. 17. The sensor apparatus 250 is deemed to generate an intermediate position signal to the controller 100 when the only the first sensor 252 is actuated and generates a corresponding actuation signal to the controller 100 while the second sensor 254 is not actuated and does not generate an actuation signal to the controller 100.

In the illustrated embodiment, the controller 100 causes braking of the truck 10 to occur by generating a regenerative brake command signal to the traction motor 110 or a brake command signal to the parking brake 120 in response to receiving the quick-exit position signal from the sensor apparatus 250.

In the illustrated embodiment, the controller 100 limits the speed of the traction motor 110 to a speed falling within a range from 0 km/hour to a first maximum speed, e.g., 6 km/hour, in response to receiving the walkie position signal from the sensor apparatus 250.

In the illustrated embodiment, the controller 100 controls the operation of the traction motor 110 to a speed falling within a range from 0 km/hour to a second maximum speed, e.g., 12 km/hour, in response to receiving the rider-driving position signal. The second maximum speed is preferably greater than the first maximum speed.

In the illustrated embodiment, the controller 100 generates a regenerative brake command signal to the traction motor 110 so as to allow the truck 10 to slow down and stop if the truck 10 is in motion and in response to receiving the intermediate position signal. In the illustrated embodiment, the rate of braking effected by the controller 100 in response to it receiving the intermediate position signal is slower than the rate of braking that occurs in response to the controller 100 receiving the quick-exit position signal. The controller 100 generates a no-drive command signal to the traction motor 110 if the truck 10 is stopped and in response to receiving the intermediate position signal. Also in response to receiving the intermediate position signal when the truck 10 is stopped, the controller 100 effects braking via the traction motor 110 or the parking brake 120.

Figure 18:
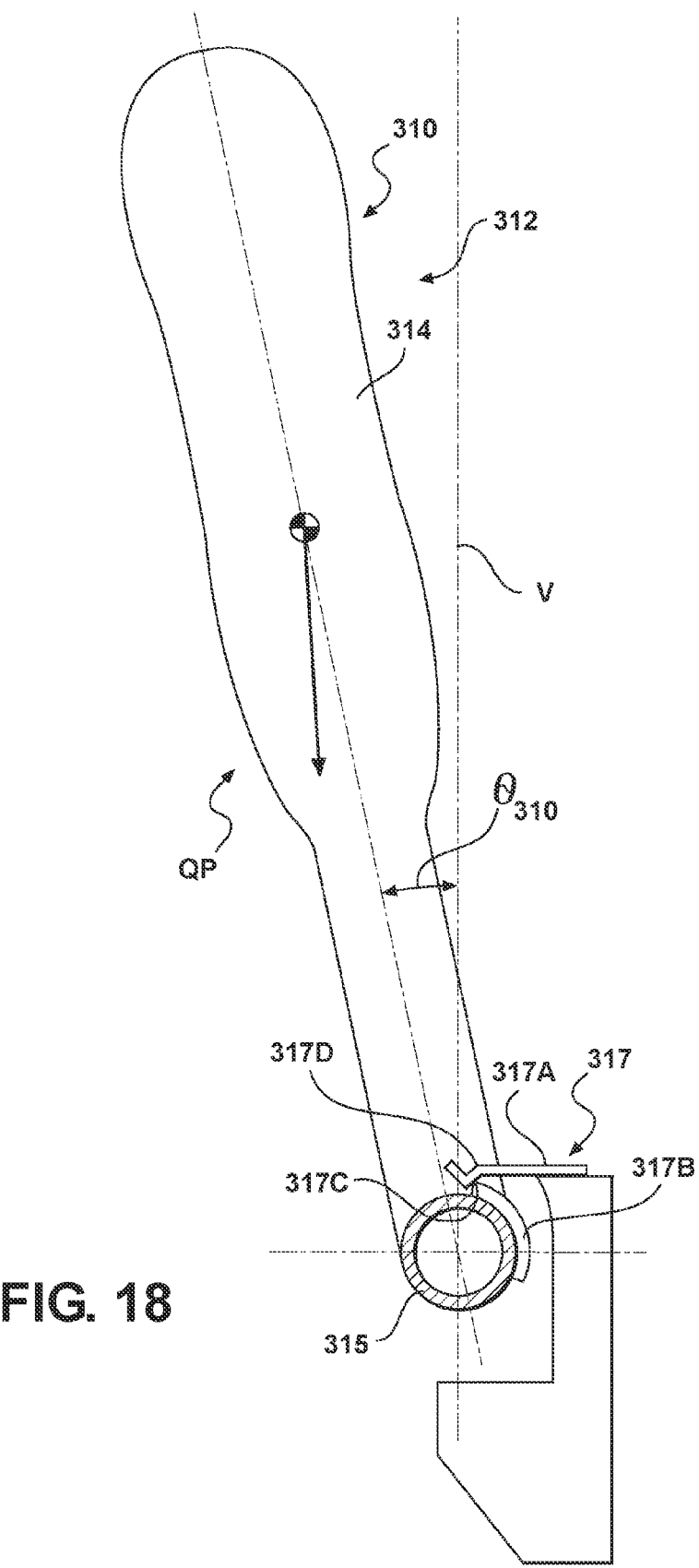
FIG. 18 is a side view, partially in cross section, of a restraint structure constructed in accordance with a second embodiment of the present invention.

A restraint structure 310 constructed in accordance with a second embodiment of the present invention is illustrated in FIG. 18. The restraint structure 310, when located in a quick-exit position QP, is positioned upward and slightly away from vertical V, i.e., on a side of vertical V near the operator and towards the platform 14, and at an angle $\theta_{310}$ to vertical V, wherein the angle $\theta_{310}$ may have a magnitude falling within a range of from about 0 degrees to about 25 degrees, see FIG. 18. The restraint structure 310 comprises a U-shaped tubular structure 312 having first and second leg members (only the first leg member 314 is illustrated in FIG. 18) and an intermediate member 315. A holding mechanism 317 comprising, in the illustrated embodiment, a spring clip 317A fixed to the truck power unit and a holding member 317B fixed to the intermediate member 315, is provided for holding the restraint structure 310 in the quick-exit position on the side of vertical V near the operator and towards the platform 14. To move the restraint structure 310 from a quick-exit position QP to a rider-driving position RP, the operator need only apply sufficient force to the restraint structure 310 so as to cause the fixed holding member 317B to overcome the force applied to it by the spring clip 317A such that a corner 317C of the holding member 317B pushes up against a V-shaped end portion 317D of the spring clip 317A thereby allowing the holding member 317B and the restraint structure 310 to rotate relative to the spring clip 317A. Because the restraint structure 310 is located at a slight angle to vertical, an operator can quickly and easily move the restraint structure 310 to the rider-driving position RP from the quick-exit position QP after overcoming the spring force applied by the spring clip 317A.

Figure 19:
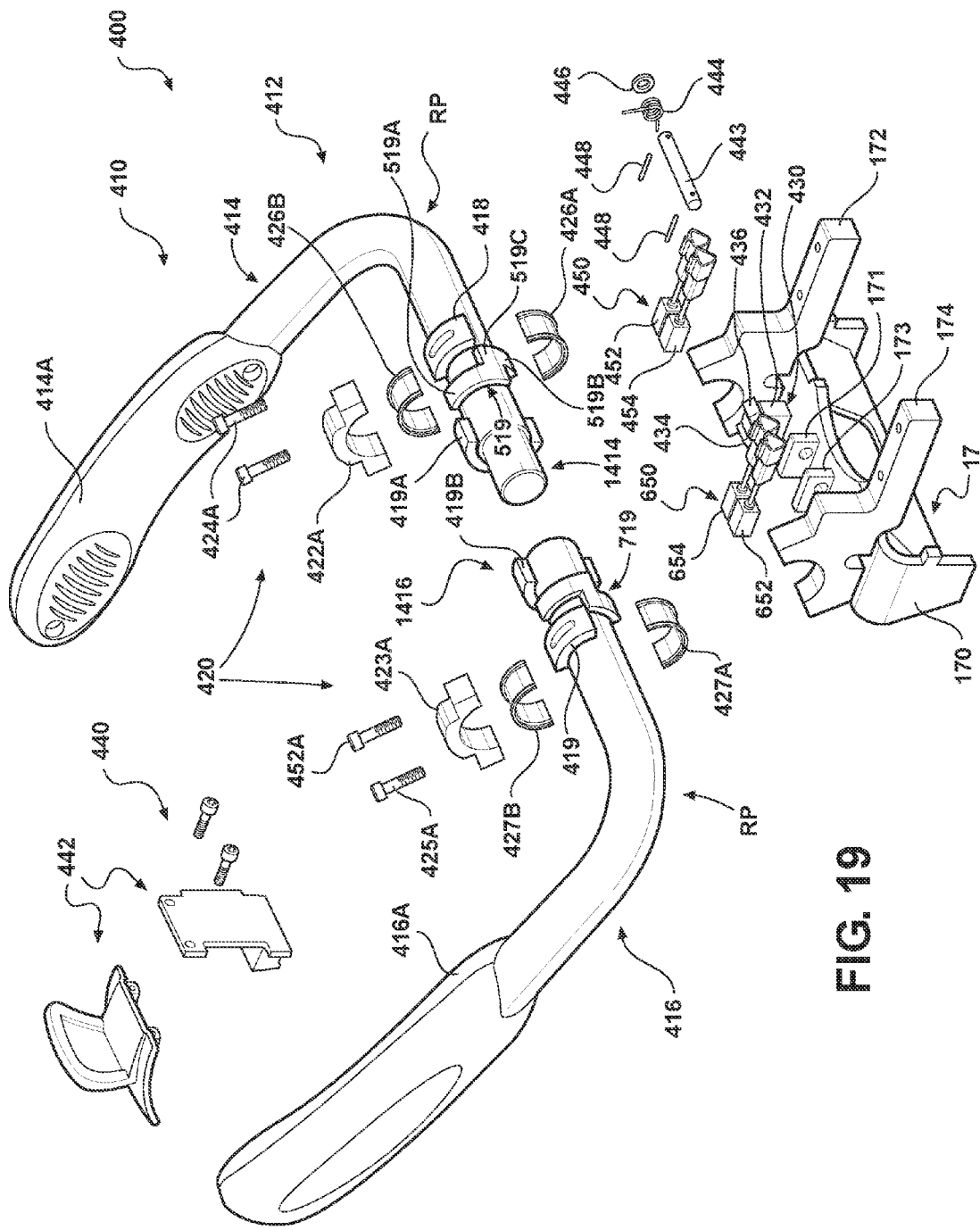
FIGS. 19 and 20 are perspective views of a restraint structure constructed in accordance with a third embodiment of the present invention.
Figure 20:
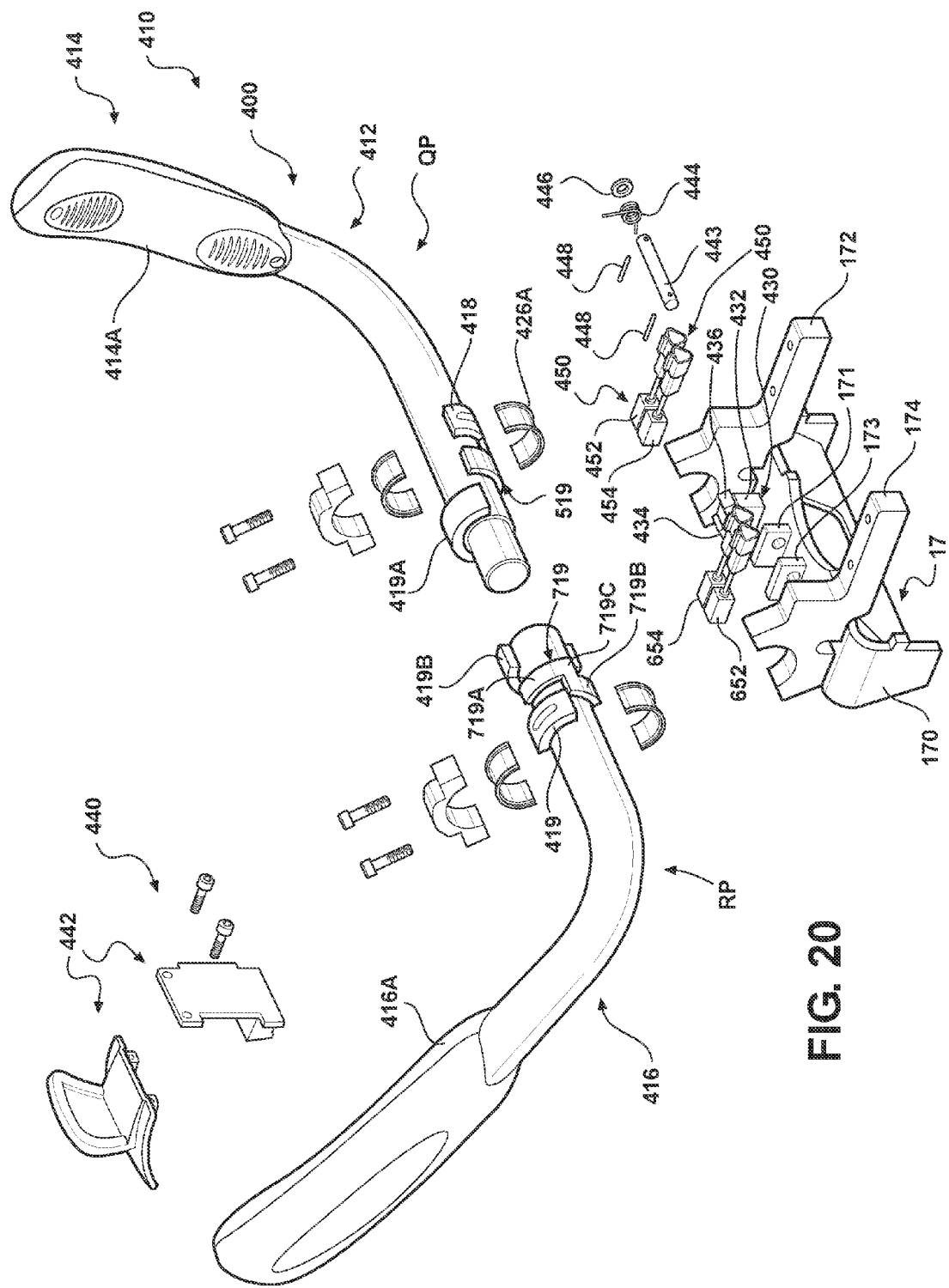

A restraint system 400 constructed in accordance with a third embodiment of the present invention is illustrated in FIGS. 19 and 20 and comprises a restraint structure 410 coupled to a power unit main housing 17. In the illustrated embodiment, the restraint structure 410 comprises a U-shaped tubular structure 412 having first and second L-shaped leg members 414 and 416 provided with first and second pads 414A and 416A. An end portion 1414 of the first L-shaped leg member 414 is capable of being received within a bore (not shown) defined within an end portion 1416 of the second L-shaped leg member 416 such that the first L-shaped leg member 414 is capable of moving/rotating relative to the second L-shaped leg member 416 and vice versa. A polymeric bushing (not shown) may be provided within the bore in the second L-shaped leg member 416 so as to allow the end portion 1414 of the first L-shaped leg member 414 to move easily relative to the end portion 1416 of the second L-shaped leg member 1416. Each of the first and second L-shaped leg members 414 and 416 is capable of being positioned in a rider-driving position RP, as shown in FIG. 19, and both may be moved simultaneously from their rider-driving positions RP to a walkie position (not shown), where the first and second L-shaped leg members 414 and 416 extend generally downward. The first L-shaped leg member 414 may be moved from the rider-driving position RP to a quick-exit position QP while the second L-shaped leg member 416 remains in the rider-driving position RP, see FIG. 20; the second L-shaped leg member 416 may be moved from the rider-driving position RP to a quick-exit position QP while the first L-shaped leg member 414 remains in the rider-driving position RP (not shown); or both the first and second L-shaped leg members 414 and 416 may be moved from their rider-driving positions RP to quick-exit positions QP (not shown).

The restraint system 400 further comprises coupling apparatus 420 for pivotally coupling the restraint structure 410 to the power unit main housing 17. The power unit main housing 17 comprises a frame 170 and first and second brackets 172 and 174, which brackets 172 and 174 are bolted, welded or otherwise fixedly coupled to the frame 170, see FIG. 19. The first L-shaped leg member 414 is pivotally coupled to the first bracket 172 via a metal clamp 422A and bolts 424A. A polymeric bushing 426A, such as a nylon bushing, is provided between the first L-shaped leg member 414 and the first bracket 172 and a further nylon bushing 426B is provided between the first L-shaped leg member 414 and the metal clamp 422A. The second L-shaped leg member 416 is pivotally coupled to the second bracket 174 via a metal clamp 423A and bolts 425A. A polymeric bushing 427A, such as a nylon bushing, is provided between the second L-shaped leg member 416 and the second bracket 174 and a further nylon bushing 427B is provided between the second L-shaped leg member 416 and the metal clamp 423A.

The restraint system 400 also comprises first and second stop structures (only the first stop structure 430 is shown in FIGS. 19 and 20), each of which is constructed in generally the same manner as stop structure 230 shown in FIG. 8. The first stop structure 430 comprises a stop block 432 for supporting first and second resilient stops 434 and 436. Likewise, the second stop structure comprises a stop block (not shown) for supporting first and second resilient stops (not shown). A first stop member 418 is fixedly coupled to the first L-shaped leg member 414 and a second stop member 419 is fixedly coupled to the second L-shaped leg member 416, see FIG. 19. The first resilient stops are engaged by the first and second stop members 418 and 419 when the first and second L-shaped leg members 414 and 416 are located in their walkie positions. The second resilient stops are engaged by the first and second stop members 418 and 419 when the first and second L-shaped leg members 414 and 416 are located in their quick-exit positions QP.

The restraint system 400 further comprises a mechanism 440 for releasably locking the first and second L-shaped leg members 414 and 416 in their rider-driving positions RP. The locking mechanism 440 comprises a pivotable lever 442 constructed in generally the same manner as the lever 242 illustrated in FIG. 5. The frame 170 comprises first and second connector walls 171 and 173, each provided with a bore. The locking mechanism 440 further comprises a shaft 443, a coil spring 444 having first and second legs, a washer 446 and first and second connector pins 448. To couple the pivotable lever 442 to the frame 170, the shaft 443 is inserted through the bores in the first and second connector walls 171 and 173 and a bore in the lever 442. The spring 444 is then positioned about the shaft 443 followed by the washer 446 being located on the shaft 443 adjacent to the spring 444. To prevent the shaft 443 from moving out from the first and second connector walls 171 and 173 and the lever 442, the first and second connector pins 448 are inserted into bores in the shaft 443. The spring 444 biases the pivotable lever 442 in a direction away from the operator and to a home position where the lever 442 engages the frame 170 so as to limit the amount of angular rotation of the lever 442 about the shaft 443.

A third stop member 419A is fixedly coupled to the first L-shaped leg member 414 and a fourth stop member 419B is fixedly coupled to the second L-shaped leg member 416.

The lever 442 comprises an upper front edge, similar to edge 2242C illustrated in FIG. 13A, which defines an engagement member. The third and fourth stop members 419A and 419B are located on the first and second L-shaped leg members 414 and 416 such that when the leg members 414 and 416 are located in their rider-driving positions RP, first edges of the third and fourth stop members 419A and 419B are positioned adjacent the upper front edge of the pivotable lever 442. The first edges of the third and fourth stop members 419A and 419B are engaged by the upper front edge of the pivotable lever 442 when the pivotable lever 242 is located in its home position and the leg members 414 and 416 are located in their rider-driving positions RP. The lever 442, by engaging the first edges of the third and fourth stop members 419A and 419B, functions to maintain/hold the first and second L-shaped leg members 414 and 416 in their rider-driving positions RP.

To move the first and second L-shaped leg members 414 and 416 from their rider-driving positions RP to their walkie positions, the operator need only pull the pivotable lever 442 in a direction away from the forks, i.e., pivot the lever 442 against the bias of the spring 444, so as to release the upper front edge of the pivotable lever 442 from engagement with the first edges of the third and fourth stop members 419A and 419B. To move one or both of the first and second L-shaped leg members 414 and 416 from a rider-driving position RP to a quick-exit position QP, the operator need only pivot one or both of the leg members 414, 416 from the rider-driving position RP to the quick-exit position QP.

To move one or both of the first and second L-shaped leg members 414 and 416 from the quick-exit position QP to the rider-driving position RP, the operator need only pivot one or both of the first and second L-shaped leg members 414 and 416 from the quick-exit position QP to the rider-driving position RP.

To move the first and second L-shaped leg members 414 and 416 from the walkie position to the rider-driving position RP, the operator need only pivot the first and second L-shaped leg members 414 and 416 from the walkie position to the rider-driving position RP.

Alternatively, the operator may pivot only one leg member from the walkie-position WP to the rider-driving position RP, and thereby cause both leg members to move simultaneously. In this embodiment, a locking device (such as a magnetic pin—not shown) fixes both leg members together when they are positioned between the walkie position WP and the rider-driving position RP, so as to allow the operator to raise both leg members into a rider-driving position RP with just one hand. This locking device is disengaged when the leg members are in the rider-driving position, so as to allow the operator to pivot only one leg member from the rider-driving position RP into the quick-exit position QP.

The restraint system 400 further comprises first sensor apparatus 450 including, in the illustrated embodiment, first and second sensors 452 and 454, such as proximity sensors, which sensors 452 and 454 are coupled to a controller. A first flag 519 is fixedly coupled to the first L-shaped leg member 414 of the restraint structure 410, see FIG. 19. The flag 519 comprises first and second legs 519A-519B and a substantially horizontal intermediate section 519C. The first and second sensors 452 and 454 are supported by structure (not shown) within the power unit main housing 17 so as to be positioned near the flag 519.

The restraint system 400 still further comprises second sensor apparatus 650 including, in the illustrated embodiment, third and fourth sensors 652 and 654, such as proximity sensors, which sensors 652 and 654 are coupled to the controller. A second flag 719 is fixedly coupled to the second L-shaped leg member 416 of the restraint structure 410, see FIG. 19. The flag 719 comprises third and fourth legs 719A-719B and a substantially horizontal intermediate section 719C. The third and fourth sensors 652 and 654 are supported by structure (not shown) within the power unit main housing 17 so as to be positioned near the flag 719.

When the first and second L-shaped leg members 414 and 416 are positioned in their quick-exit positions QP, the first and third legs 519A and 719A of the flags 519 and 719 are positioned directly across from the second and fourth sensors 454 and 654 while a gap is positioned directly across from the first and third sensors 452 and 652. Hence, the second and fourth sensors 454 and 654 sense the first and third legs 519A and 719A while the first and third sensors 452 and 652 do not sense the flags 519 and 719. Hence, only the second and fourth sensors 454 and 654 are actuated and generate a corresponding actuation signal to the controller while the first and third sensors 452 and 652 are not actuated and do not generate an actuation signal to the controller. The first sensor apparatus 450 is deemed to generate a first quick-exit position signal to the controller when only the second sensor 454 is actuated and generates a corresponding actuation signal to the controller while the first sensor 452 is not actuated and does not generate an actuation signal to the controller. The second sensor apparatus 650 is deemed to generate a second quick-exit position signal to the controller when only the fourth sensor 654 is actuated and generates a corresponding actuation signal to the controller while the third sensor 652 is not actuated and does not generate an actuation signal to the controller.

When the first and second L-shaped leg members 414 and 416 are positioned in their rider-driving positions RP, the intermediate sections 519C and 719C of the flags 519 and 719 are positioned directly across from the first, second, third and fourth sensors 452, 454, 652 and 654. Hence, the first, second, third and fourth sensors 452, 454, 652 and 654 sense the intermediate sections 519C and 719C of the first and second flags 519 and 719 such that the first, second, third and fourth sensors 452, 454, 652 and 654 are actuated and generate corresponding actuation signals to the controller. The first and second sensor apparatuses 450 and 650 are deemed to generate first and second rider-driving position signals to the controller when the first and second sensors 452 and 454 and the third and fourth sensors 652 and 654 sense the intermediate sections 519C and 719C of the flags 519 and 719.

When the first and second L-shaped leg members 414 and 416 are positioned in their walkie positions, no portions of the flags 519 and 719 are positioned directly across from the first, second, third and fourth sensors 452, 454, 652 and 654. Hence, the first, second, third and fourth sensors 452, 454, 652 and 654 do not sense the flags 519 and 719, are not actuated and do not generate actuation signals to the controller. The first and second sensor apparatuses 450 and 650 are deemed to generate first and second walkie position signals to the controller when the first, second, third and fourth sensors 452, 454, 652 and 654 are not actuated and do not generate actuation signals to the controller.

When the first and second L-shaped leg members 414 and 416 are positioned between their rider-driving positions and walkie positions, the second leg 519B of the flag 519 and the fourth leg 719B of the flag 719 are positioned directly across from the first and third sensors 452 and 652 while no portions of the flags 519 and 719 are positioned directly across from the second and fourth sensors 454 and 654. Hence, the first and third sensors 452 and 652 sense the second and fourth legs 519B and 719B while the second and fourth sensors 454 and 654 do not sense the flags 519 and 719. Hence, only the first and third sensors 452 and 652 are actuated and generate corresponding actuation signals to the controller while the second and fourth sensors 454 and 654 are not actuated and do not generate an actuation signal to the controller. The first and second sensor apparatuses 450 and 650 are deemed to generate first and second intermediate position signals to the controller when only the first and third sensors 452 and 652 are actuated and generate a corresponding actuation signal to the controller while the second and fourth sensors 454 and 654 are not actuated and do not generate an actuation signal to the controller.

The controller causes braking of the truck to occur by generating a regenerative brake command signal to a traction motor or a brake command signal to a parking brake in response to receiving one or both of the first and second quick-exit position signals from the sensor apparatuses 450 and 650.

In the illustrated embodiment, the controller limits the speed of the traction motor to a speed falling within a range from 0 km/hour to a first maximum speed, e.g., 6 km/hour, in response to receiving one or both of the first and second walkie position signals from the sensor apparatuses 450 and 650.

In the illustrated embodiment, the controller controls the operation of the traction motor to a speed falling within a range from 0 km/hour to a second maximum speed, e.g., 12 km/hour, in response to receiving both of the first and the second rider-driving position signals. The second maximum speed is preferably greater than the first maximum speed.

In the illustrated embodiment, the controller generates a regenerative brake command signal to the traction motor so as to allow the truck to slow down and stop if the truck is in motion and in response to receiving one or both of the first and second intermediate position signals. In the illustrated embodiment, the rate of braking effected by the controller in response to it receiving one or both of the first and second intermediate position signals is slower than the rate of braking that occurs in response to the controller receiving one or both of the first and second quick-exit position signals. The controller generates a no-drive command signal to the traction motor if the truck is stopped and in response to receiving one or both of the first and second intermediate position signals. Also in response to receiving one or both of the first and second intermediate position signals when the truck is stopped, the controller effects braking via the traction motor or the parking brake.

Figure 21:
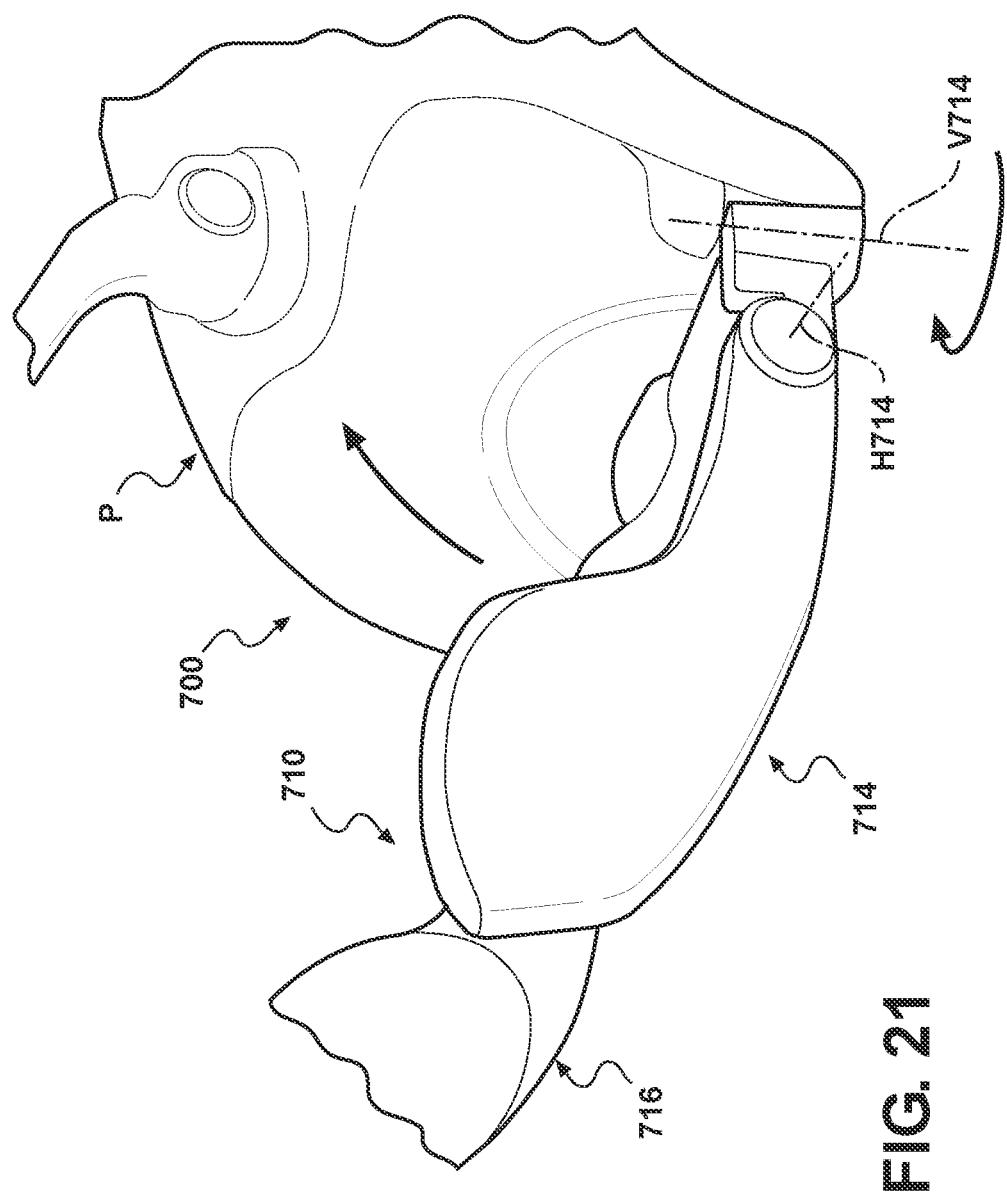
FIG. 21 is a perspective view of a restraint structure constructed in accordance with a fourth embodiment of the present invention.

A restraint system 700 constructed in accordance with a fourth embodiment of the present invention is illustrated in FIG. 21 and comprises a restraint structure 710 comprising inwardly foldable first and second leg members 714 and 716, each of which is separately coupled to a truck power unit P. The first and second leg members 714 and 716 are each positionable in a first stowed position against the power unit P and a second, outwardly extending rider-driving position, as shown in FIG. 21, so as to extend along opposing sides of an operator when the operator is standing on a truck platform. As illustrated in FIG. 21, the first leg member 714 is pivotable about a substantially vertical axis $V_{714}$ so as to allow the first member 714 to move between its stowed and rider-driving positions. The second leg member 716 is likewise pivotable about a substantially vertical axis so as to allow the second leg member 716 to move between its stowed and rider driving positions. The first leg member 714 is further pivotable about a substantially horizontal axis $H_{714}$ so as to allow the first leg member 714 to be moved between its rider-driving position, as shown in FIG. 21, and a quick-exit position, where it is extending upward so as to be substantially parallel or at a slight angle to vertical. The second leg member 716 is further pivotable about a substantially horizontal axis so as to allow the second leg member 716 to be moved between its rider-driving position and a quick-exit position, where it is extending upward so as to be substantially parallel or at a slight angle to vertical.

The first leg member 714 may be moved from the rider-driving position to the quick-exit position while the second leg member 716 remains in the rider-driving position; the second leg member 716 may be moved from the rider-driving position to the quick-exit position while the first leg member 714 remains in the rider-driving position; or both the first and second leg members 714 and 716 may be moved from their rider-driving positions to their quick-exit positions.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A walkie/rider pallet truck comprising:
    a power unit;
    a set of forks associated with said power unit;
    a platform associated with said power unit and defining a location upon which an operator may stand; and
    a restraint system comprising a pivotable restraint structure, said restraint structure being movable to one of a walkie position, a rider-driving position and a quick-exit position, wherein the quick-exit position is located generally vertically above the walkie and rider-driving positions.

2. The walkie/rider pallet truck as set out in claim 1, wherein said restraint structure is positioned within an angular range of from about 0 degrees to about 25 degrees from vertical and extending upward and away from said platform when in said quick-exit position.

3. The walkie/rider pallet truck as set out in claim 1, wherein said restraint structure is positioned within an angular range of from about 0 degrees to about 25 degrees from vertical and extending upward and toward said platform when in said quick-exit position.

4. The walkie/rider pallet truck as set out in claim 1, wherein said restraint structure is in a stowed position when located in said walkie position and an outwardly, extended position when in said rider-driving position.

5. The walkie/rider pallet truck as set out in claim 4, wherein said restraint structure comprises a generally U-shaped structure, which is adapted to extend along opposing sides of an operator when the operator is standing on said platform and said restraint structure is in said rider-driving position.

6. The walkie/rider pallet truck as set out in claim 1, wherein said restraint system further comprises a mechanism for releasably locking said restraint structure in said rider-driving position.

7. The walkie/rider pallet truck as set out in claim 6, wherein said locking mechanism comprises a pivotable lever having an engagement member capable of releasably engaging a stop member forming part of said restraint structure.

8. A walkie/rider pallet truck comprising:
a power unit comprising a drive/braking system;
a set of forks associated with said power unit;
a platform associated with said power unit and defining a location upon which an operator may stand;
a controller to control the operation of said drive/braking system;
a restraint system comprising a pivotable restraint structure, said restraint structure being movable to a quick-exit position; and
sensor apparatus to sense when said restraint structure is in said quick-exit position and generating a corresponding quick-exit position signal to said controller, said controller generating a brake command signal to said drive/braking system in response to receiving said quick-exit position signal from said sensor apparatus.

9. The walkie/rider pallet truck as set out in claim 8, wherein said restraint structure is also capable of being moved to a walkie position or a rider-driving position.

10. The walkie/rider pallet truck as set out in claim 9, wherein said sensor apparatus further senses when said restraint structure is in said walkie position or said rider-driving position, said sensor apparatus generating a walkie position signal to said controller when said restraint structure is in said walkie position and generating a rider-driving position signal to said controller when said restraint structure is in said rider-driving position, said controller controlling said drive/braking system to a speed falling within a range from zero to a first maximum speed in response to receiving said walkie position signal and controlling said drive/braking system to a speed falling within a range from zero to a second maximum speed in response to receiving said rider-driving position signal, said second maximum speed being greater than said first maximum speed.

11. The walkie/rider pallet truck as set out in claim 10, wherein said sensor apparatus is further capable of sensing when said restraint structure is positioned between said walkie position and said rider-driving position, said sensor apparatus generating an intermediate position signal to said controller when said restraint structure is located between said walkie position and said rider-driving position, said controller generating a braking command signal to said drive/braking system so as to allow said truck to slow down and stop if said truck is in motion and in response to receiving said intermediate position signal, and generating a no-drive command signal to said drive/braking system if said truck is stopped and in response to receiving said intermediate position signal.

12. A walkie/rider pallet truck comprising:
a power unit comprising a drive/braking system;
a set of forks associated with said power unit;
a platform associated with said power unit and defining a location upon which an operator may stand;
a controller for controlling the operation of said drive/braking system;
a restraint system comprising a pivotable restraint structure, said restraint structure being movable to one of a walkie position, a rider-driving position and a quick-exit position; and
sensor apparatus to sense when said restraint structure is in said quick-exit position and to generate a quick-exit position signal to said controller.

13. The walkie/rider pallet truck as set out in claim 12, wherein said restraint structure is positioned within an angular range of from about 0 degrees to about 25 degrees from vertical and extending upward when in said quick-exit position.

14. The walkie/rider pallet truck as set out in claim 13, wherein said controller generates a brake command signal to said drive/braking system in response to receiving said quick-exit position signal from said sensor apparatus.

15. The walkie/rider pallet truck as set out in claim 14, wherein said sensor apparatus further senses when said restraint structure is in said walkie position or said rider-driving position, said sensor apparatus generating a walkie position signal to said controller when said restraint structure is in said walkie position and a rider-driving position signal to said controller when said restraint structure is in said rider-driving position, said controller controlling said drive/braking system to a speed falling within a range from zero to a first maximum speed in response to receiving said walkie position signal and controlling said drive/braking system to speed falling within a range from zero to a second maximum speed in response to receiving said rider-driving position signal, said second maximum speed being greater than said first maximum speed.

16. The walkie/rider pallet truck as set out in claim 15, wherein said sensor apparatus is further capable of sensing when said restraint structure is positioned between said walkie position and said rider-driving position, said sensor apparatus generating an intermediate position signal to said controller when said restraint structure is located between said walkie position and said rider-driving position, said controller generating a brake command signal to said drive/braking system so as to allow said truck to slow down and stop if said truck is in motion and in response to receiving said intermediate position signal and generating a no-drive signal to said drive/braking system if said truck is stopped and in response to receiving said intermediate position signal.

17. A walkie/rider pallet truck comprising:
a power unit;
a set of forks associated with said power unit;
a platform associated with said power unit and defining a location upon which an operator may stand; and
a restraint system comprising first and second pivotable members, each of which is movable to one of a walkie position, a rider-driving position and a quick-exit position, wherein the quick-exit position is located generally vertically above the walkie and rider-driving positions.

18. The walkie/rider pallet truck as set out in claim 17, wherein said first pivotable member is capable of being separately moved to the quick-exit position where it is positioned within an angular range of from about 0 degrees to about 25 degrees from vertical and extends generally upward.

19. The walkie/rider pallet truck as set out in claim 17, wherein said first and second pivotable members comprise first and second L-shaped pivotable members.

20. A walkie/rider pallet truck comprising:
   a power unit;
   a set of forks associated with said power unit;
   a platform associated with said power unit and defining a location upon which an operator may stand; and
   a restraint system comprising first and second pivotable members, each of which is separately movable about a substantially vertical axis between a stowed position and a rider-driving position and further separately movable about a substantially horizontal axis between the rider-driving position and a quick-exit position.

* * * * *

UNITED STATES PATENT AND TRADEMARK OFFICE
CERTIFICATE OF CORRECTION

PATENT NO. : 8,523,224 B2  
APPLICATION NO. : 12/577245  
DATED : September 3, 2013  
INVENTOR(S) : Michael P. Gallagher et al.

Page 1 of 1

It is certified that error appears in the above-identified patent and that said Letters Patent is hereby corrected as shown below:

In the Specification

Col. 6, line 41, "when the thumb wheel 1808 is in a" should read --when the thumb wheel 180B is in a--;

Col. 10, line 54, "senses the flag second leg 3198" should read --senses the flag second leg 319B--;

Col. 13, lines 24-25, "stop members 419A and 4198" should read --stop members 419A and 419B--;

Col. 13, line 28, "stop members 419A and 4198" should read --stop members 419A and 419B--;

Col. 13, line 31, "419A and 4198 are engaged" should read --419A and 419B are engaged--;

Col. 15, line 22, "legs 519B and 7198" should read --legs 519B and 719B--.

Signed and Sealed this
Tenth Day of December, 2013

Margaret A. Focarino
*Commissioner for Patents of the United States Patent and Trademark Office*